US012793194B2

(12) United States Patent
Lyons et al.

(10) Patent No.: US 12,793,194 B2
(45) Date of Patent: Nov. 10, 2026

(54) DEEP REGULARIZED COMPOUND GAUSSIAN NETWORK

(71) Applicant: The Government of the United States of America, as represented by the Secretary of the Navy, Arlington, VA (US)

(72) Inventors: Carter Lyons, Washington, DC (US); Raghu Raj, Washington, DC (US); Margaret Cheney, Fort Collins, CO (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 222 days.

(21) Appl. No.: 18/666,713

(22) Filed: May 16, 2024

(65) Prior Publication Data

US 2025/0166147 A1 May 22, 2025

Related U.S. Application Data

(60) Provisional application No. 63/513,686, filed on Jul. 14, 2023, provisional application No. 63/502,582, filed on May 16, 2023.

(51) Int. Cl.
*G06T 7/00* (2017.01)
*G06F 17/11* (2006.01)

(52) U.S. Cl.
CPC ................ *G06T 7/00* (2013.01); *G06F 17/11* (2013.01); *G06T 2207/20084* (2013.01)

(58) Field of Classification Search
CPC .. G06T 7/00; G06T 2207/20084; G06F 17/11
See application file for complete search history.

(56) References Cited

U.S. PATENT DOCUMENTS

2024/0070827 A1* 2/2024 Maharramov ............ G06T 5/80
2025/0069290 A1* 2/2025 Rajagopal ............... G06T 12/20
2025/0194949 A1* 6/2025 Ertin ...................... G16H 30/40
2026/0024175 A1* 1/2026 Chen ......................... G06T 5/60

* cited by examiner

*Primary Examiner* — Ming Shui
(74) *Attorney, Agent, or Firm* — US Naval Research Laboratory; William P. Ladd

(57) ABSTRACT

Systems and methods are provided for using a deep neural network for image estimation using a (learned) compound Gaussian prior. For example, embodiments of the present disclosure use an unrolled deep network that solves linear inverse problems with particular application in tomographic imaging and image compressive sensing. Systems and methods in accordance with embodiments of the present disclosure result in image reconstructions with a higher similarity index than those produced by conventional methods. Image reconstructions enabled by embodiments of the present disclosure are useful in a variety of applications, including radar, sonar, medical, and tomographic imaging systems.

20 Claims, 17 Drawing Sheets

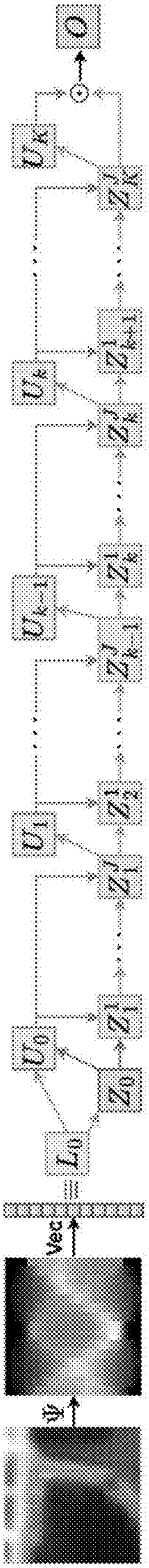
FIG. 3A
$L_0 = \mathbf{y}$
$U_k = (A^T_{Z_k^J} A_{Z_k^J} + \lambda_k I)^{-1} A^T_{Z_k^J} L_0$
$O = U_K \odot Z_K^J$
$Z_0 = \mathcal{P}_{\alpha,\beta}(A^T L_0)$
$Z_k^j = Z_k^{j-1} + \eta_k^j \mathbf{d}_k^j(Z_k^{j-1}, U_{k-1}, L_0)$
FIG. 3B
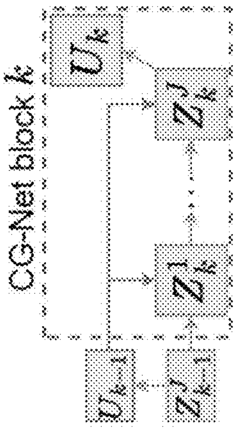
FIG. 3C (a) Fifteen uniform angles and 60dB SNR.

(b) Ten uniform angles and 60dB SNR.

(c) Six uniform angles and 60dB SNR.

(d) Six uniform angles and 40dB SNR.

(e) Six uniform angles and 30dB SNR.

(f) Six uniform angles and 20dB SNR.

(a) Original (b) Measurement (c) CG-Net (0.954) (d) MADUN (0.846) (e) ISTA-Net$^+$ (0.905) (f) ReconNet (0.526)

(g) Original (h) Measurement (i) CG-Net (0.829) (j) MADUN (0.678) (k) ISTA-Net$^+$ (0.534) (l) ReconNet (0.186)

- Each $Z_k$ includes $J$ updates of $z$ (denoted by function $g$)

DEEP REGULARIZED COMPOUND GAUSSIAN NETWORK

CROSS REFERENCE TO RELATED APPLICATIONS

This application claims the benefit of U.S. Provisional Patent Application No. 63/502,582, filed on May 16, 2023, and U.S. Provisional Patent Application No. 63/513,686, filed on Jul. 14, 2023, both of which are incorporated by reference herein in their entireties.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; nrltechtran@us.navy.mil, referencing Navy Case Number 211588-US2.

FIELD OF THE DISCLOSURE

This disclosure relates to image processing, including object recognition.

BACKGROUND

Reconstructing a digital image and/or digital signal from measurement data is generally a linear inverse problem. A variety of techniques have been used for image estimation, including iterative approaches and deep learning approaches. Conventional techniques using either of these approaches suffer from several disadvantages. In conventional iterative imaging systems, disadvantages include the limitation to a narrow set of signal priors (statistics), slow convergence, and inability for real-time imaging.

For example, the Iterative Shrinkage and Thresholding Algorithm (ISTA) restricts prior distribution of the desired signal to the Laplace distribution, which does not capture desired statistical properties including self-similarity, heavy-tailed marginal distributions, and self-reinforcement among local coefficients and is slow to converge.

The Compressive Sampling Matching Pursuit (CoSaMP) algorithm restricts prior distribution of the desired signal to the Laplace distribution, which does not capture desired statistical properties including self-similarity, heavytailed marginal distributions, and self-reinforcement among local coefficients. Success is highly dependent on signal sparsity, which is not accurate for many signals and images.

The $l_1$ least squares ($l_1$-LS) restricts prior distribution of the desired signal to the Laplace distribution, which does not capture desired statistical properties including self-similarity, heavy-tailed marginal distributions, and self-reinforcement among local coefficients. It can be slow to converge.

The Bayesian Compressive Sensing (BCS) algorithm restricts prior distribution of the desired signal to the Student's t distribution, which does not capture desired statistical properties including self-similarity, heavy-tailed marginal distributions, and self-reinforcement among local coefficients. Enforces higher levels of signal sparsity, which is not accurate for many signals and images. It is slow to converge.

The Hierarchical Bayesian Maximum a Posteriori algorithm uses compound Gaussian prior distribution, with scale variable fixed to a log normal distribution, to iteratively solve a linear inverse problem with particular application in tomographic imaging. This method outperforms comparative iterative estimation approaches, with Compound Gaussian Least Squares (below) performing comparably, but is computationally intensive and slow to converge.

The Compound Gaussian Least Squares (CG-LS) algorithm uses a compound Gaussian prior distribution, with scale variable fixed to a log normal distribution, to iteratively and alternatively solve a linear inverse problem with particular application in tomographic imaging. This method outperforms comparative iterative estimation approaches, with HB-MAP performing comparably, but is slow to converge.

In conventional deep learning imaging systems disadvantages include the reliance on significant amounts of imaging training data and the black-box nature of these systems. For example, Reconstruction Network (ReconNet) uses a standard convolution neural network to solve a linear inverse problem with particular application in compressive sensing. In using standard convolutional layers, this method is a blackbox process where there is little understanding as to what each layer in this neural network is representing. The method does not incorporate any prior information about the signals of interest. These factors consequently require ReconNet to be trained on a significant amount of training samples to be accurate.

Iterative Shrinkage and Thresholding Algorithm Network (ISTA-Net) structures a deep neural network around the iterative shrinkage and thresholding algorithm for solving linear inverse problems with particular application in compressive sensing. The proximal operator evaluation in ISTA is replaced by a sequence of convolutional layers in ISTA-Net. Restricts prior distribution of the desired signal to the Laplace distribution, which does not capture desired statistical properties including self-similarity, heavy-tailed marginal distributions, and self-reinforcement among local coefficients. Method performs well when trained on a significant amount of training data, but stagnates when few training samples are available.

Memory Augmented Deep Unfolded Network (MADUN) structures a deep neural network around the iterative shrinkage and thresholding algorithm for solving linear inverse problems with particular application in compressive sensing. The proximal operator evaluation in ISTA is replaced by a convolutional long short-term network in MAD UN. This method does not incorporate any prior information about the signals of interest and instead learns this from data provided to the network. Consequently, MADUN requires a significant amount of training samples required to train the network for sufficient accuracy. A significant component, the long short-term networks, of this method is a blackbox process where the precise relationship between the signal and network layer outputs is unclear.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings:

FIGS. 3A-3C show another example of a CG-Net image reconstruction network in accordance with an embodiment of the present disclosure;

Figure 1:
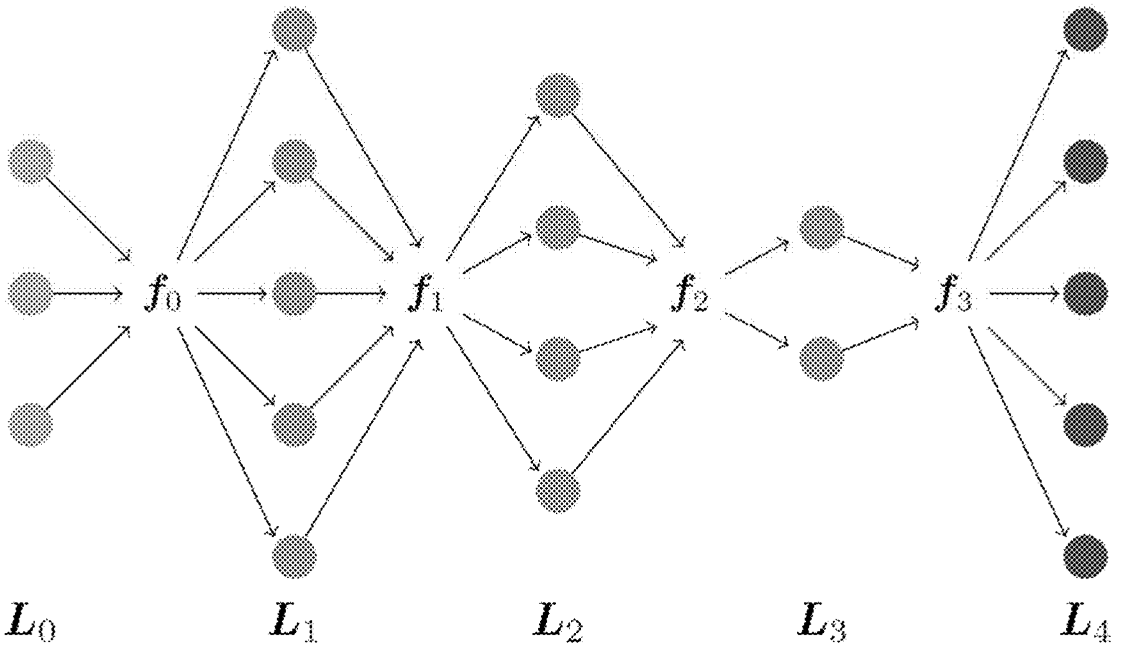
FIG. 1 is an example deep neural network with: Input layer $L_0 \in \mathbb{R}^3$, first hidden layer $L_1 \in \mathbb{R}^5$, second hidden layer $L_2 \in \mathbb{R}^4$, third hidden layer $L_3 \in \mathbb{R}^2$, and output layer in $L_4 \in \mathbb{R}^5$ in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

Overview

Embodiments of the present disclosure use a deep neural network for image estimation using a (learned) compound Gaussian prior. For example, embodiments of the present disclosure use an unrolled deep network that solves linear inverse problems with particular application in tomographic imaging and image compressive sensing. Systems and methods in accordance with embodiments of the present disclosure result in image reconstructions with a higher similarity index than those produced by conventional methods. Image reconstructions enabled by embodiments of the present disclosure are useful in a variety of applications, including radar, sonar, medical, and tomographic imaging systems.

Embodiments of the present disclosure provide a deep neural network, Deep Regularized Compound Gaussian Network (DR-CG-Net), that is formed from applying algorithm unrolling to a generalized Compound Gaussian Least Squares (CG-LS) iterative algorithm. The generalized CG-LS algorithm incorporates a compound Gaussian prior, which decomposes a signal of interest into the product of a scale variable component and Gaussian component. The compound Gaussian prior is a generalization on an assumed Laplace prior and t distribution and has been shown empirically to better capture statistical properties for signals of interest. Additionally, the generalized CG-LS algorithm does not fix the scale variable distribution and instead retains an implicit distribution that can be specified on an application specific basis.

In an embodiment, DR-CG-Net learns the scale variable distribution from the training data and is the first deep neural network to incorporate learning a prior distribution while still constraining to a specific class of priors. In an embodiment, DR-CG-Net constrains to the powerful class of compound Gaussian priors. In doing so, DR-CG-Net maintains the useful impact of the compound Gaussian prior, but has greater flexibility and learning capacities within this class of priors to represent signals.

Systems and methods according to embodiments of the present disclosure significantly outperform comparative methods and perform comparably in tomographic imaging and compressive sensing, when only a small amount of training data is available. Additionally, when larger amounts of training data are available, systems and methods according to embodiments of the present disclosure outperforms conventional tomographic imaging techniques.

It is an aspect of the present disclosure to provide a method for reconstructing an image. The method includes accessing measurement data with a computer system, where the measurement data have been acquired from a subject using an imaging system. A neural network is also accessed with the computer system, where the neural network has been trained on training data to reconstruct an image from data consistent with the measurement data. The neural network includes an unrolled iterative reconstruction algorithm that implements a compound Gaussian prior. A reconstructed image is generated from the measurement data by inputting the measurement data to the neural network using the computer system, thereby generating the reconstructed image from an output of the neural network. The reconstructed image may then be output with the computer system.

It is another aspect of the present disclosure to provide a method for training a neural network to reconstruct an image from measurement data. The method includes accessing training data with a computer system, where the training data include matched pairs of measurement data and sparse domain coefficients. A neural network is trained on the training data, using the computer system, to learn parameters of the neural network. The neural network includes an unrolled iterative reconstruction algorithm implementing a compound Gaussian prior. The neural network and the learned parameters are stored with the computer system as a trained neural network.

Described here are systems and methods for reconstructing images and/or signals using a deep learning model that incorporates a compound Gaussian prior. As a non-limiting example, the deep learning model can be implemented as a deep neural network that incorporates a broad compound Gaussian prior distribution for the signal-of-interest (e.g., the image or signal to be reconstructed) into a deep learning framework for solving general linear inverse problems. In some implementations, the disclosed systems and methods may be referred to as a "CG-Net." Unlike previous unrolling approaches, the systems and methods described in the present disclosure do not need to replace any part of the original optimization of the iterative reconstruction framework with a neural network structure that must be learned from scratch, which provides for a better interpretability of the CG-Net.

It is an aspect of the systems and methods described in the present disclosure to provide a deep learning-based reconstruction algorithm that incorporates a compound Gaussian prior. The compound Gaussian prior may be a generalization on the Laplace prior and/or Student's t-distribution. Advantageously, the compound Gaussian prior can better capture statistical properties of the signals of interest. Accordingly, by incorporating a compound Gaussian prior into the reconstruction techniques described in the present disclosure, an improvement in reconstructed signal quality can be achieved relative to previous deep learning-based reconstruction techniques, even when only a small number of training data samples is available. Moreover, the incorporation of the compound Gaussian prior in the disclosed systems and methods provides a more computationally efficient implementation that is faster and easier to implement in a deep neural network structure. Accordingly, the functioning of the computer system implementing the reconstruction techniques described in the present disclosure is also improved by way of the reduced computational burden on the limited resources of the computer system (e.g., reduced memory burden, reduced computational complexity).

Image Reconstruction

Image reconstruction is often formulated as an underdetermined linear inverse problem. In other words, the forward measurement model may be formulated as:

$$y=\Psi x+v, \tag{1}$$

where $x\in\mathbb{R}^n$ is a vectored, n=N×N, image observed through a measurement matrix $\Psi\in\mathbb{R}^{m\times n}$, with additive white noise, $v\in\mathbb{R}^m$, and where $y\in\mathbb{R}^m$ are the underdetermined linear measurements. Typically, m<<n implying that obtaining the signal or image, x, given the measurements, y, does not produce a unique solution. Although, exploiting the sparsity of images under a change of basis makes it possible to uniquely reconstruct an image with measurements sampled below the Nyquist frequency. Letting $\Phi\in\mathbb{R}^{n\times n}$ be a sparsity inducing transformation, such as the discrete Fourier transform or a wavelet dictionary, and letting $c\in\mathbb{R}^n$ be the sparse coefficients of x, and by defining $A=\Psi\Phi$, Eqn. (1) can be rewritten as, $$y=Ac+v. \tag{2}$$

Now, the inverse estimation problem to Eqn. (2) aims to recover the sparse coefficients, c, from the measurements, y, corresponding to an observation method, Ψ, and sparsity transform, Φ, chosen a priori. Often, image estimation is solved by an iterative algorithm, which involves the minimization of an objective function and may include subspace projections between minimization steps. Many iterative algorithms for image estimation have been developed, including Iterative Shrinkage and Thresholding, Basis Pursuit, Bayesian Compressive Sensing (BCS), and Compressive Sampling Matching Pursuit (CoSaMP).

One useful way to formulate inverse problems in imaging is by Bayesian estimation. In particular, considering the maximum a posteriori (MAP) estimation of c from Eqn. (2):

$$c^*=\underset{c}{\operatorname{argmin}}\{-\log(p(y\mid c))-\log(p(c))\}, \tag{3}$$

which can, equivalently, be viewed as a regularized least squares (RLS) optimization:

$$c^*=\underset{c}{\operatorname{argmin}}\|y-Ac\|_2^2+R(c). \tag{4}$$

As the regularization satisfies $R(c)\propto-\log(p(c))$, the choice of prior density, p(c), of the sparse coefficients, c, is a useful component to incorporate domain level knowledge into the image reconstruction problem.

Compound Gaussian Prior

With that in mind, the systems and methods described in the present disclosure make use of a compound Gaussian prior. Sparse coefficients of natural images exhibit self-similarity, heavy-tailed marginal distributions, and self-reinforcement among local coefficients. Such properties are not encompassed by the generalized Gaussian prior typically assumed for the image sparsity coefficients. Instead, a class of densities known as compound Gaussian ("CG") densities, or Gaussian scale mixtures, better captures the statistical properties of sparse coefficients of natural images and images from other modalities, such as radar. A useful formulation of the CG prior lies in modeling the sparse coefficients of images as the Hadamard product:

$$c = z \odot u = [\,z_1u_1 \quad z_2u_2 \quad \cdots \quad z_nu_n\,]^T \tag{5}$$

such that z=h(x), where $h:\mathbb{R}\to\mathbb{R}$ is a componentwise, positive, nonlinear function, x follows a multi-scale Gaussian tree process, $u\sim\mathcal{N}(0, \Sigma_u)$, and u and z are independent random variables. The CG prior subsumes many well-known distributions including the generalized Gaussian allowing an interpretation of the CG prior as a generalization of compressive sensing work.

Algorithm Unrolling and Deep Neural Networks

Deep neural networks (DNN) generally include three main layer types: input, hidden, and output. An example DNN is shown in FIG. 1. FIG. 1 is an example deep neural network with: Input layer $L_0\in\mathbb{R}^3$, first hidden layer $L_1\in\mathbb{R}^5$, second hidden layer $L_2\in\mathbb{R}^4$, third hidden layer $L_3\in\mathbb{R}^2$, and output layer in $L_4\in\mathbb{R}^5$ in accordance with an embodiment of the present disclosure. The input layer, $L_0$, is assigned the input data to the network such as the measurements, y, from Eqn. (2). The output layer, $L_4$, returns the desired output from the network, when provided an input, such as the wavelet coefficients, c, from Eqn. (2). Finally, hidden layers, $L_1$, $L_2$, and $L_3$, are transformations of the input data to produce the desired output. In general, $L_i\in\mathbb{R}^{d_i}$ where $d_i$ corresponds to the number of hidden units in the layer.

Layers of a DNN are connected by functions, $f_i$, parameterized by $\theta_i$, such that $$L_{i+1} = f_i(L_i;\theta_i) \quad \text{for} \quad i = 0, 1, \ldots, k \tag{6}$$

where $L_i$ is network layer i and the network contains k hidden layers. For a standard, fully connected, neural network (NN)

$$f_i(x;[W_i, b_i]) = \sigma(W_ix + b_i) \tag{7}$$

where $x\in\mathbb{R}^n$ is an input vector, $W_i\in\mathbb{R}^{m\times n}$ is a weight matrix, $b_i=\mathbb{R}^m$ is a bias vector, and $\sigma:\mathbb{R}\to\mathbb{R}$ is a componentwise activation function. Standard activation functions include sigmoid, Rectified Linear Unit (ReLU), and hyperbolic tangent. In networks described in the present disclosure, the input may include noisy Radon transform measurements, or other medical imaging or other imaging data, $y_i\in\mathbb{R}^m$, from (2), and the output layer returns the estimated wavelet coefficients denoted by $c(y_i;\Theta\in\mathbb{R}^n$ where $\Theta=[\theta_0, \ldots, \theta_k]$ are the network parameters.

Using a training dataset, $\mathcal{D}=\{(y_i, c_i):i=1, 2, \ldots, M\}$, the network parameters, $\Theta=[\theta_0, \ldots, \theta_k]$, may be learned by optimizing a loss or error function, $\mathcal{L}(\Theta)$, between the network outputs $c(y_i;\Theta)$, and actual wavelet coefficients $c_i$. Common loss functions for image reconstruction neural networks include mean-squared error (MSE), normalized mean-squared error (NMSE), peak signal to noise ratio (PSNR), SSIM, or linear combinations of these.

In some implementations, algorithm unrolling may be used when constructing the deep learning-based machine learning models described in the present disclosure. Algorithm unrolling structures a DNN based upon an iterative image estimation algorithm (IIEA). Algorithm unrolling places the operations from each step j of the IIEA as the function $f_j$ defining the layers in a DNN. Then the parameters, $\theta_j$, on each step j of the IIEA parameterize $f_j$ in the DNN. By training the unrolled DNN, each $\theta_j$ is learned, which optimizes the IIEA, to produce improved image estimates. Algorithm unrolling can provide significant performance improvements in image reconstruction while offering simple interpretability of the network layers.

CG-LS Algorithm

It is an aspect of the systems and methods described in the present disclosure to provide an iterative image estimation algorithm, referred to as compound Gaussian least squares (CG-LS), for solving Eqn. (2) with general sensing matrix Ψ, under the assumption of a global compound Gaussian prior. Informed by the statistical representation of image coefficients through the compound Gaussian prior, the CG-LS iterative image reconstruction algorithm, which enforces the compound Gaussian prior, is used as the reconstruction framework for developing the CG-Net deep learning reconstruction model. CG-LS is based on an RLS optimization where a regularization term is chosen to enforce the CG prior. Furthermore, the CG-LS algorithm is unrolled into a DNN that may be referred to as CG-Net. For training CG-Net, image estimation is estimated from Radon transform measurements, or other medical imaging or other imaging data types, as these data types underlie many imaging applications, including microwave, acoustic, and medical imaging modalities.

An example of the CG-LS iterative reconstruction algorithm is now described in more detail. Consider $$c^* = \underset{c}{\operatorname{argmin}}\|y - Ac\|_2^2 + R(c),$$

the regularized least squares estimate of c from Eqn. (2). The regularization function, $R:\mathbb{R}^n\to\mathbb{R}$, is determined by the prior enforced on c. For the compound Gaussian prior, we decompose $c=z\odot u$ where $z=h(x)=\sqrt{\exp(x/\alpha)}$, for Gaussian random vectors u and x, and we aim to estimate z and u. Let h be the component-wise, invertible, nonlinear function in the CG prior and $f=h^{-1}$ the inverse nonlinearity. Hence, the following regularization may be selected, as an example:

$$R(z, u) = \lambda\|u\|_2^2 + \mu\|f(z)\|_2^2 \tag{8}$$

to enforce normality of u and $x=f(z)$, and the regularized least squares estimate $[(z^*)^T (u^*)^T]^T$ may be considered to be given as the solution to:

$$\underset{[z,u]}{\operatorname{argmin}}\|y - A(z\odot u)\|_2^2 + \lambda\|u\|_2^2 + \mu\|f(z)\|_2^2. \tag{9}$$

Based on the component-wise nonlinearity $h(x)=\sqrt{\exp(x/\alpha)}$, the inverse is also a component-wise function and may be given by $f(z)=2\alpha\ln(z)$. The regularization, R(z,u), may approximate the log prior from a MAP estimation while still capturing the desired statistical properties for the prior. Empirically, this approximation is effective for the underlying problem of estimating image wavelet coefficients, or other sparse domain coefficients.

For a vector $w\in\mathbb{R}^n$, $D\{w\}=\mathrm{diag}(w)$ can be defined and $A_w=AD\{w\}$. Due to the explicit joint estimation in Eqn. (9), optimization may be performed by block coordinate descent, which on iteration k may be given by the following:

$$z_k = \underset{z}{\operatorname{argmin}}\|y - A_{u_{k-1}}z\|_2^2 + \mu\|f(z)\|_2^2 \tag{10}$$

$$u_k = \underset{u}{\operatorname{argmin}}\|y - A_{z_k}u\|_2^2 + \lambda\|u\|_2^2. \tag{11}$$

Algorithm 1 below details pseudocode for the CG-LS estimate of u and z.

Algorithm 1 CG-LS

Input: Measurement y, measurement operator A, number of iterations K, and number of Newton descent steps J 1: $z_0 = T_\epsilon(A^T y)$ and $u_0 = (A_{z_0}^T A_{z_0} + \lambda I)^{-1} A_{z_0}^T y$ 2: for $k \in \{1, 2, \ldots, K\}$ do 3: z ESTIMATION:

4: $z_k^0 = z_{k-1}$

5: for $j \in \{0, 1, \ldots, J-1\}$ do

6: Compute step size $\eta_k^j$ (Armijo line search)

7: Compute $d_k^j = (H(z_k^j; u_{k-1}))^{-1} v(z_k^j; u_{k-1}, y)$

8: $z_k^{j+1} = T_\epsilon(z_k^j - \eta_k^j d_k^j)$

9: end for

10: $z_k = z_k^J$

11: u ESTIMATION:

12: $u_k = (A_{z_k}^T A_{z_k} + \lambda I)^{-1} A_{z_k}^T y$

13: end for

Output: $c^* = z_K \odot u_K$

Note that Eqn. (11) is a Tikhonov regularization problem with a solution given by:

$$u_k = (A_{z_k}^T A_{z_k} + \lambda I)^{-1} A_{z_k}^T y. \tag{12}$$

As a non-limiting example, Eqn. (10) can be solved using damped Newton descent, which uses the gradient and Hessian of Eqn. (10), given respectively by:

$$v(z; u, y) = 2A_u^T(A_u z - y) + 2\mu D\{[h^{-1}]'(z)\}h^{-1}(z) \tag{13}$$

$$H(z; u) = 2A_u^T A_u + 2\mu D\{w(z)\}, \tag{14}$$

where $$w(z) = D\{[h^{-1}]''(z)\}h^{-1}(z) + D\{[h^{-1}]'(z)\}[h^{-1}]'(z). \tag{15}$$

For clarity, "step" may be used to refer to an update of z by damped Newton descent (or other techniques) and "iteration" to refer to an update of both u and z in CG-LS. It can be shown that Eqn. (10), with $f(z)=h^{-1}(z)=2\alpha\ln(z)$, is a convex cost function so long as $z\in(0, e)^n$. Hence, in some examples, a nonlinear thresholding operator may be applied to z after each Newton descent step, such as the following component-wise operator:

$$T_\epsilon(x) = \begin{cases} \epsilon & x \le 0 \\ x & 0 < x < e \\ e-\epsilon & x \ge e \end{cases} \tag{16}$$

where $\epsilon$ is a small positive real number. Thus, z on Newton descent step j+1 of iteration k, denoted by $$z_k^{j+1},$$

is $$z_k^{j+1} = T_\epsilon\left(z_k^j - \eta_k^j\left(H\left(z_k^j; u_{k-1}\right)\right)^{-1} v\left(z_k^j; u_{k-1}, y\right)\right) \tag{17}$$

where $$\eta_k^j$$

is a step size often chosen via a backtracking, Armijo line search, or the like.

As a non-limiting example, a convergence criterion for CG-LS can be implemented as follows: Let $\delta$ be a small positive real number and define the Newton decrement $\lambda(z;u, y)\in\mathbb{R}$ as $$\lambda(z; u, y) = v(z; u, y)^T(H(z; u))^{-1}v(z; u, y). \tag{18}$$

The Newton decrement serves as a convergence metric for Newton descent. Thus, before each Newton descent step, that is between lines 5 and 6 in Algorithm 1, a check can be made if $$\lambda\left(z_k^j; u_{k-1}, y\right) \le \delta.$$

When this holds the Newton descent steps are exited and the algorithm proceed with the next u estimate, $u_k$, given in line 12 of Algorithm 1. Once $$\lambda\left(z_k^0; u_{k-1}, y\right) \le \delta,$$

that is, Newton descent is unnecessary because the error tolerance has been reached, it can be said that CG-LS has converged and the algorithm can be terminated. If no $k\in\{1, 2, \ldots, K\}$ exists such that $$\lambda(z_k^0; u_{k-1}, y) \le \delta$$

then CG-LS did not converge.

In addition to Algorithm 1, the CG-LS algorithm may also be implemented with Algorithm 2 illustrated below.

Algorithm 2 Compound Gaussian Least Squares (CG-LS)

```
z_0 = P_{a,b}(A^T y) and u_0 = (A_{z_0}^T A_{z_0} + λI)^{-1} A_{z_0}^T y
for k ∈ {1, 2, . . . , K} do
  z ESTIMATION:
  z_k^0 = z_{k-1}
  for j ∈ {1, 2, . . . , J} do
    if ||∇_z F(u_{k-1}, z_k^{j-1})||_{*(k,j)}^2 < δ then
      return z_k = z_k^{j-1}
    end if
    Compute step size η_k^{(j)} (backtracking line search)
    Compute descent vector d_k^j = d_k^j(z_k^{j-1}; u_{k-1}, y)
    z_k^j = z_k^{j-1} + η_k^{(j)} d_k^j(z_k^{j-1}; u_{k-1}, y)
  end for
  z_k = z_k^J
  u ESTIMATION:
  u_k = (A_{z_k}^T A_{z_k} + λI)^{-1} A_{z_k}^T y
end for
Output: c* = z_K ⊙ u_K
```

In this example, steps are performed using a steepest descent instead of damped Newton descent. As described above, CG-LS is an iterative reconstruction algorithm that approximately solves the optimization in Eqn. (9).

The cost function is a regularized least squares cost function where, as given by the CG prior, the sparse coefficients are decomposed as $c = z \odot u$ and the regularization may be taken to be $$R(c) = R(u, z) = \lambda\|u\|_2^2 + \mu\|f(z)\|_2^2$$

to enforce normality of u and $x = f(z)$, a Gaussian tree process, as desired from the CG prior.

As the optimization in Eqn. (10) cannot be solved analytically, in some examples a steepest descent approach can be used to iteratively and approximately solve Eqn. (10). Given a norm $\|\cdot\|$ on $\mathbb{R}^n$ and differentiable function, $g(x)$: $\mathbb{R}^n \to \mathbb{R}$, the steepest descent direction, $d: \mathbb{R}^n \to \mathbb{R}^n$, is defined as $$d(x) = \|\nabla g(x)\|_* \left(\underset{\|v\|=1}{\operatorname{argmin}} \nabla g(x)^T v\right) \tag{19}$$

where $\|\cdot\|_*$ is the dual norm given by $\|w\|_* = \max_{\|v\|=1} w^T v$. For instance the Euclidean norm produces $d(x) = -\nabla g(x)$. Additionally, each steepest descent step may be scaled by a step size, $\eta = \eta(x)$, determined by a backtracking line search. That is, given two user-chosen parameters $\tau \in (0, \frac{1}{2}]$ and $\beta \in (0,1)$ the step size is chosen to be $\eta = \beta^r$ where $r = r(x)$ is the minimum, non-negative integer such that $$g(x + \beta^r d(x)) \le g(x) + \tau\beta^r \nabla g(x)^T d(x). \tag{20}$$

In some examples, r can be determined by incrementing from zero until Eqn. (20) is first satisfied. With an initial guess $x^0$ the sequence $$\{x^j\}_{j=1}^{\infty}$$

generated by steepest descent is given by $x^j = x^{j-1} + \eta^{(j)} d(x^{j-1})$ where $\eta^{(j)}$ depends on the previous step $x^{j-1}$ as $\eta^{(j)} = \beta^{r(x^{j-1})}$.

Now, when applying steepest descent to the cost function in Eqn. (10), $$z_k^j$$

can be referred to as the estimate of z on steepest descent step j of iteration k. For generality, a different norm may define each steepest descent step as is the case in Newton descent for a convex cost function with non-constant Hessian. The descent direction corresponding to norm $\|\cdot\|_{(k,j)}$, with dual norm $\|\cdot\|_{*(k,j)}$, for steepest descent step j of iteration k can be denoted as $$d_k^j = d_k^j(z).$$

Furthermore, the backtracking line search step size for steepest descent step j of iteration k can be denoted as $$\eta_k^{(j)} = \beta^{r\left(z_k^{j-1}\right)}.$$

Thus, $$z_k^j$$

may be given by:

$$z_k^j = z_k^{j-1} + \eta_k^{(j)} d_k^j\left(z_k^{j-1}\right). \tag{21}$$

Note, $$d_k^j = d_k^j(z) = d_k^j(z; u_{k-1}, y) \text{ as } d_k^j$$

is parameterized by $u_{k-1}$ and y. Let J be the maximum number of steepest descent steps; then, for notation, $$z_k^J = z_k = z_{k+1}^0,$$

as described above.

As described above, Eqn. (11) has the Tikhonov solution in Eqn. (12). Next, the initial estimate of z can be defined as $z_0 = \mathcal{P}_{a,b}(A^T y)$ where the modified ReLU function is defined by (where $\mathrm{ReLU}(x) = \max\{0, x\}$)

$$\mathcal{P}_{a,b}(x) = a + \mathrm{ReLU}(x - a) - \mathrm{ReLU}(x - b)$$

and is applied elementwise to $A^Ty$. $\mathcal{P}_{a,b}$ is a projection operator onto the interval [min{a, b}, max{a, b}]. This eliminates negative values, as z should have positive components, and limits the maximum values in the initial z estimate. The initial u estimate, denoted as $u_0$, is given by Eqn. (12).

Finally, the gradient, $\nabla_z F(u,z)$, and a user-chosen parameter $\delta>0$ determine convergence of CG-LS. On each steepest descent step j of iteration k, a check is made if $$\|\nabla_z F(u_{k-1}, z_k^{j-1})\|_{*(k,j)} < \delta.$$

When this holds, the steepest descent steps are exited, taking $$z_k = z_k^{j-1}.$$

Once $$\|\nabla_z F(u_{k-1}, z_k^0)\|_{*(k,1)} < \delta \ CG-LS$$

has converged and the estimates $u_{k-1}$ and $z_{k-1}$ are returned. Otherwise, CG-LS may terminate after a user-chosen maximum number of iterations K, or some other user-defined stopping condition.

Generalized CG-LS Algorithm

In some implementations, the CG-LS algorithms described above may be generalized. The generalized CG-LS algorithm implements a regularized least squares optimization with regularization including a Gaussian term and an implicitly defined term, which together encorce a compound Gaussian prior. For example, image coefficients can be decomposed according to the CG prior, $c=z\odot u$, and a MAP estimate of the scale variable, z, and Gaussian vector, u, can be considered from Eqn. (2). That is, the following cost function can be defined:

$$F(u, z) = \frac{1}{2}\|y - A(z\odot u)\|_2^2 + \frac{1}{2}u^T P_u^{-1} u + \mathcal{R}(z) \tag{22}$$

and the following estimate, which is equivalent to the MAP estimate, may be considered:

$$[u^* \ \ z^*] = \operatorname*{argmin}_{u,z\in\mathbb{R}^n\times\mathfrak{Z}} F(u, z) \tag{23}$$

where $\mathfrak{Z}\subseteq[0, \infty)^n$ is the convex domain of $\mathcal{R}$. Note $P_u \propto \Sigma_u$, for $\Sigma_u$ the covariance of u, and $\mathcal{R}(z)\propto -\log(p_z(z))$ where $p_z$ is the prior density for the scale variable. The G-CG-LS algorithm, given in Algorithm 3 below, is an iterative algorithm that approximately solves Eqn. (23) through block coordinate descent.

| Algorithm 3 G-CG-LS | |
|---|---|
| 1: | $z_0 = \mathcal{P}_{[0,b]}(A^Ty)$ and $u_0 = \mathcal{T}(z_0)$ |
| 2: | for $k \in \{1, 2, \ldots, K\}$ do |
| 3: | $z_k^{(0)} = z_{k-1}$ |

-continued

| Algorithm 3 G-CG-LS | |
|---|---|
| 4: | for $j \in \{1, 2, \ldots, J\}$ do |
| 5: | $z_k^{(j)} = g(z_k^{(j-1)}, u_{k-1})$ |
| 6: | end for |
| 7: | $z_k = z_k^{(J)}$ |
| 8: | $u_k = \mathcal{T}(z_k)$ |
| 9: | end for |
| Output: $c^* = z_K \odot u_K$ | |

For vector v, $A_v = A\mathrm{diag}(v)$ can be defined where diag(v) is the diagonal matrix formed by placing the entries of v on the diagonal. Now, the following can be defined:

$$\mathcal{T}(z) = \mathcal{T}(z; P_u) = \left(A_z^T A_z + P_u^{-1}\right)^{-1} A_z^T y \tag{24}$$

and letting g(z,u) be a scale variable update method such that:

$$\mathcal{Z}(z, u) = \underbrace{g\circ \ldots \ g\circ g(z, u)}_{J times} \approx \operatorname*{argmin}_{z\in\mathfrak{Z}} F(u, z). \tag{25}$$

At least two possibilities for g are described below. Note that $\mathcal{T}(z)=\operatorname{argmin}_u F(u,z)$ is a Tikhonov solution. Then, on iteration k of G-CG-LS the following estimates can be determined:

$$z_k = \mathcal{Z}(z_{k-1}, u_{k-1}) \text{ and } u_k = \mathcal{T}(z_k; P_u) \tag{26}$$

Note that, in practice, the inverse in Eqn. (24) may not be calculated and may instead be solved as a system of linear equations. Furthermore, the computational time to calculate Eqn. (24) can be reduced by using the following Woodburry matrix identity:

$$\mathcal{T}(z; P_u) = P_u A_z^T\left(I + A_z P_u A_z^T\right)^{-1} y. \tag{27}$$

Additionally, for a convex set $\mathcal{C}$ let $$\mathcal{P}_C(x) = \operatorname*{argmin}_{v\in C} \frac{1}{2}\|x - v\|_2^2$$

be the unique projection onto $\mathcal{C}$. Initial estimates can be defined as $z_0 = \mathcal{P}_{[a,b]^n}(A^Ty)$ and $u_0 = \mathcal{T}(z_0)$. Let ReLU(x)= max{x,0} be the rectified linear unit activation function. It is noted that:

$$\mathcal{P}_{[a,b]^n}(x) \equiv [\mathcal{P}_{[a,b]}(x_i)]_{i=1}^n = [a + ReLU(x_i - a) - ReLU(x_i - b)]_{i=1}^n. \tag{28}$$

Applying $\mathcal{P}_{[a,b]^n}$ n eliminates negative values, as $z_0$ should have positive components, and limits the maximum values in the initial estimate for numerical stability in calculating $u_0$.

Scale Variable Update Methods

As mentioned above, at least two example implementations for updating the scale variable in the G-CG-LS algorithm are described. Each of these example methods are described as using a step size η>0.

In a first example, a projected gradient descent ("PGD") method can be used. In the PGD approach, the following updates are performed:

$$\begin{aligned} g(z, u) &= \mathcal{P}_3(\nabla_z F(u, z)) &(29)\\ &= \mathcal{P}_3\left(z - \eta\left(A_u^T(A_u z - y) + \nabla \mathcal{R}(z)\right)\right). &(30)\end{aligned}$$

In a second example, an iterative shrinkage and thresholding ("ISTA") method can be used. In the ISTA approach, the following updates are performed:

$$\begin{aligned} g(z, u) &= prox_{\eta\mathcal{R}}\left(z - \eta A_u^T(A_u z - y)\right) &(31)\\ &= \underset{\zeta \in 3}{\text{argmin}}\ \frac{1}{2}\left\|\zeta - \left(z - \eta A_u^T(A_u z - y)\right)\right\|_2^2 + \eta\mathcal{R}(\zeta) &(32)\end{aligned}$$

where $prox_f$ is the proximal operator of a function $f$ and is well-defined for convex $f$. For a non-smooth, convex function, $f$, the proximal operator is an optimization tool as fixed points of $prox_f$ minimize $f$. The general ISTA method, which is equivalent to a proximal gradient descent method, is an optimization method for the sum of a convex, differentiable function and a convex, non-smooth function. From the use of the proximal operator on the non-smooth piece, fixed points of ISTA are optimality points of the original sum of functions.

CG-Net Structure

Figure 2:
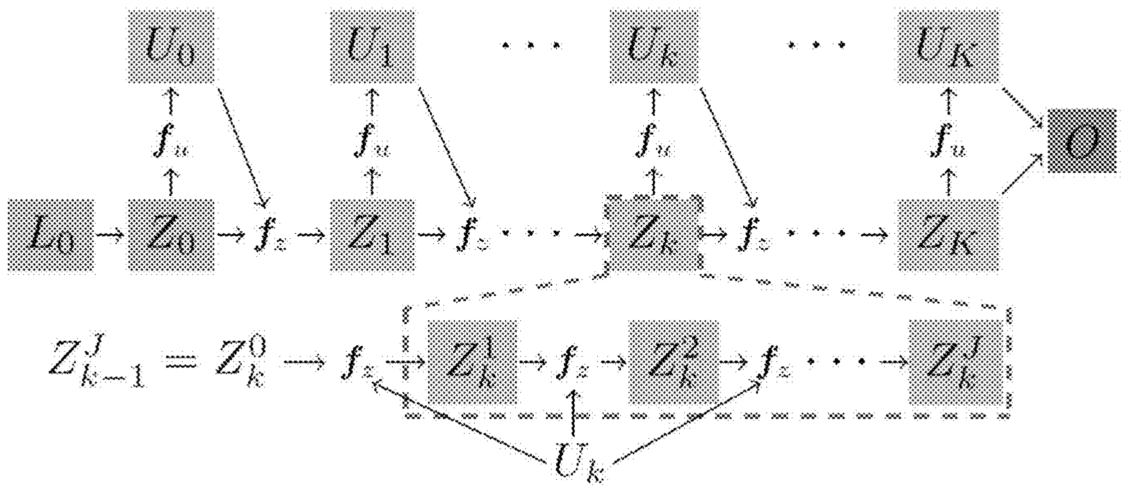
FIG. 2 is an example block structure for a CG-Net image reconstruction network, which is the unrolled deep neural network of the compound Gaussian least squares algorithm in accordance with an embodiment of the present disclosure.

As described above, a deep neural network, CG-Net, may be constructed by applying algorithm unrolling to the CG-LS algorithm, such as the algorithm summarized in Algorithm 1. As a non-limiting example, the CG-Net model may have a structure as shown in FIG. 2. FIG. 2 is an example block structure for a CG-Net image reconstruction network, which is the unrolled deep neural network of the compound Gaussian least squares algorithm in accordance with an embodiment of the present disclosure. CG-Net includes an input layer, $L_0$, initialization layer, $Z_0$, output layer, O, and K CG-Net blocks. Each CG-Net block, k, contains J Newton descent z update layers, $$Z_k^1, \ldots, Z_k^K,$$

and a single u update layer, $U_k$. Every layer takes the measurements y as an input and is omitted for clarity. In the illustrated example, there are two main operations between layers: $f_u: \mathbb{R}^n \times \mathbb{R}^m \to \mathbb{R}^n$ and $f_z: \mathbb{R}^n \times \mathbb{R}^n \times \mathbb{R}^m \to \mathbb{R}^n$, which may be defined by:

$$f_u(z, y) = \left(A_z^T A_z + \lambda I\right)^{-1} A_z^T y \tag{33}$$

$$f_z(z, u, y) = T_\epsilon\left(z - \eta(H(z; u))^{-1} v(z; u, y)\right). \tag{34}$$

Thus, $$f_z\left(z_k^j, u_{k-1}, y\right)$$

corresponds to updating z on descent step j+1 of iteration k in CG-LS and $f_u(z_{k-1}, y)$ corresponds to updating u on iteration k of CG-LS. In some other examples, when developing the CG-Net model from Algorithm 2, the operation for updating z using a steepest descent may include $$g_k^j(z, u, y) \equiv g_k^j\left(z, u, y; a_k^j, b_k^j, \eta_k^{(j)}, d_k^j\right),$$

which is parameterized by a descent vector, $$d_k^j,$$

step size, $$\eta_k^{(j)}$$

and modified ReLU parameters $$a_k^j \text{ and } b_k^j,$$

corresponding to updating z as:

$$g_k^j(z, u, y) = \mathcal{P}_{a_k^j, b_k^j}\left(z + \eta_k^{(j)} d_k^j(z; u, y)\right). \tag{35}$$

In CG-LS, the step size, $$\eta_k^{(j)},$$

may be found by a backtracking line search. In CG-Net, the application of the modified ReLU activation function, $\mathcal{P}_{a,b}$, at each steepest descent step serves to guarantee the next step is not too large and stays within the domain of interest for z.

The network blocks in FIG. 2 include the following. The input block, $L_0$, includes the input layer, which receives the measurement y. The initialization block, $Z_0$, includes a single layer that gives the initial estimate of z from line 1 of Algorithm 1 or Algorithm 2. That is, $Z_0 = T_\in(A^T y)$ or $= \mathcal{P}_{a_0, b_0}(A^T y)$. The kth U block, $U_k$, contains a single layer giving the update of u on iteration k from line 12 in Algorithm 1 or line 15 in Algorithm 2, for example. Block $U_0$ corresponds to the initial estimate of u from line 1 in Algorithm 1 or Algorithm 2. Thus, $U_0 = f_u(Z_0, y)$ and for all k=1, 2, . . . , K, $$U_k = f_u\left(Z_{k-1}^J, y\right)$$

for example. The kth Z block, $Z_k$, includes J layers, denoted $$Z_k^j,$$

and corresponds to lines 4-10 of Algorithm 1 or lines 4-13 in Algorithm 2, for example. That is, $$Z_k^{j+1} = f_z\left(Z_k^j, U_{k-1}, y\right)$$

gives z on descent step j of iteration k of Algorithm 1 (or $$Z_k^j = g_k^j\left(Z_k^{j-1}, U_{k-1}, y\right)$$

for Algorithm 2), for j=0, 1, . . . , J−1 and k=1, 2, . . . , K. Note, to simplify notation, $$Z_k^0 = Z_{k-1}^J \text{ and } Z_0 = Z_1^0.$$

The output block, O, includes a single output layer that gives the estimated wavelet coefficients (or other sparse domain coefficients)

$$c^* = Z_K^J \odot U_k.$$

CG-Net contains K+1 estimation layers for u, KJ descent step layers for z, one input, one output, and one initialization layer. Thus, CG-Net contains K(J+1)+4 layers in total.

FIGS. 3A-3C show another example of a CG-Net image reconstruction network in accordance with an embodiment of the present disclosure. FIG. 3A shows an example end-to-end network structure for CG-Net. FIG. 3B shows an example mathematical description of each layer in the CG-Net. CG-Net includes an input layer, $L_0$, initialization layer, $Z_0$, output layer, O, and K CG-Net blocks. Each CG-Net block, k, contains J steepest descent layers, $$Z_k^1, \ldots, Z_k^J,$$

and a single Tikhonov layer, $U_k$, as illustrated in FIG. 3C. Every layer takes the measurements, $L_0 \equiv y$, as an input so these connections are omitted for clarity.

FIG. 3A illustrates an example end-to-end network structure for CG-Net, which as described above is the unrolled deep neural network of Algorithm 2. A mathematical description of each layer is given in FIG. 3B. As described above, CG-Net includes of an input layer, $L_0$, initialization layer, $Z_0$, output layer, O, and K CG-Net blocks. As shown in FIG. 3C, each CG-Net block, k, contains J descent layers, $$Z_k^1, \ldots, Z_k^J,$$

and a single Tikhonov layer, $U_k$. Every layer takes the measurements, $L_0 \equiv y$, as an input so these connections are omitted for clarity.

Network Parameters and Loss Function

In CG-Net the function $f_u = f_u(z, y; \lambda_k)$, connecting layers $$Z_k^J$$

and $U_k$ for every k=1, 2, . . . . K, is parameterized by a positive regularization scalar, $\lambda_k$. In CG-LS a fixed constant $\lambda_k = \lambda$ is taken for all k, where $\lambda$ is given in Eqn. (11), but for training the CG-Net different constants, learned by the DNN, may be allowed in each update of u (e.g., at each layer updating u). In some examples, the initialization layer, $Z_0$, may also be parameterized by two positive real numbers $a_0 > z_{min}$ and $b_0 > z_{min}$, which may be applied through the modified ReLU function, $\mathcal{P}_{a_0,b_0}$.

Next, parameters of the function $f_z$ may depend on the choice of nonlinearity h for the CG prior. In the example described above, $h(x)=\sqrt{\exp(x/\alpha)}$ was chosen, such that $h^{-1}(z)=2\alpha \ln(z)$ and therefore $f_z(z,u,y)$ in Eqn. (34) is given by:

$$T_\epsilon\left(z - \eta\left(A_u^T A_u + \kappa D\{w_1(z)\}\right)^{-1}\left(A_u^T(A_u z - y + \kappa w_2(z)\right)\right)$$

where $K=4\mu\alpha^2$ and $w_1:(0, \infty) \to \mathbb{R}$ and $w_2:(0, \infty) \to \mathbb{R}$ are component-wise functions defined by:

$$w_1(x) = \frac{1 - \ln(x)}{x^2} \text{ and } w_2(x) = \frac{\ln(x)}{x},$$

respectively. Hence, $$f_z = f_z\left(z, u, y; \eta_k^j, k_k^j\right),$$

which connects two layers $U_k$ and $$Z_k^j$$

to layer $$Z_k^{j+1}$$

for every k=1, 2, . . . , K and every j=0, 1, . . . , J−1, is parameterized by $$\eta_k^j,$$

a descent step size, and $$\kappa_k^j,$$

a scaled product of a regularization scalar, μ, and CG prior constant, α. Again to simplify notation the following are denoted $$Z_k^0 = Z_{k-1}^J$$

and $$Z_0 = Z_1^0.$$

In CG-LS a fixed constant $$\kappa_k^j = 4\mu\alpha$$

is taken for all k and j, but for training the CG-Net different constants, learned by the DNN, are allowed for each update step of z. To increase trainability of the network, the descent step size $$\eta_k^j,$$

which may be chosen by a backtracking line search in CG-LS, is allowed to be a matrix in $\mathbb{R}^{n\times n}$ instead of a single constant. Choosing $$\eta_k^j$$

to be a matrix provides CG-Net with flexibility to update a coordinate of z as a function of all coordinates of the search direction $(H(z;u))^{-1}v(z;u, y)$ instead of a function of a single coordinate. Such flexibility may increase the rate that the descent steps are able to traverse through the optimization landscape of problem Eqn. (10). Nevertheless, if a single constant step size is optimal then CG-Net can simply learn $$\eta_k^j$$

as a scaled identity matrix. Alternatively, some $$\eta_k^j$$

may be considered to be constrained to a specific structure, such as a diagonal matrix. Therefore, the CG-Net parameters Θ may be:

$$\Theta = \left[\lambda_k, \kappa_k^j, \eta_k^j\right]_{k\in\{1,2,\ldots,K\}}^{j\in\{0,1,\ldots,J-1\}}.$$

At a maximum, when every $$\eta_k^j$$

is a full matrix, CG-Net contains $K(J(n^2+1)+1)$ parameters although this will be less when certain $$\eta_k^j$$

have specific structure constraints.

To learn the CG-Net parameters, Θ, a loss function involving the structural similarity index measure ("SSIM") function may be used, such as:

$$\mathcal{L}_{\mathcal{B}}(\Theta) = \frac{1}{|\mathcal{B}|}\sum\nolimits_{(y_i,c_i)\in\mathcal{B}}(1 - SSIM(\Phi c(y_i;\Theta), \Phi c_i)) \quad (36)$$

for $\mathcal{B}\subset\mathcal{D}$ a batch of training data points. This cost function may be optimized through adaptive moment estimation ("ADAM"), which is a stochastic gradient-based optimizer. Other common optimization methods include: stochastic gradient descent, RMSprop, and Adadelta. The gradient $\frac{\partial\mathcal{L}_{\mathcal{B}}}{\partial\Theta}$ used in ADAM is calculated via backpropagation through the network. Backpropagation calculations are easily and quickly implemented with automatic differentiation, which is readily available in most machine learning libraries, such as Tensorflow.

In some examples, for each $$Z_k^j$$

layer, defined by (35), the steepest descent vector $$d_k^j(z;u) = -B_k^j\nabla_z F(z;u)$$

may be implemented for a positive definite matrix $$B_k^j$$

that will be learned in CG-Net. In this example, the descent vector is the steepest descent based upon the quadratic norm $$\|\cdot\|^2_{\left(B_k^j\right)^{-1}}.$$

Thus, CG-Net can be understood as learning the quadratic norm defining every steepest descent step that optimally traverses the landscape of the cost function in (10). For matrix L, let Q and Λ be the eigendecomposition of $(L+L^T)/2$. That is, $(L+L^T)/2=Q\Lambda Q^T$. For small $\in >0$, the diagonal matrix $\Lambda_\in$ may be defined as $[\Lambda_\in]_{ii}=\max\{\Lambda_{ii},\in\}$ and let, $$P_\epsilon(L) = Q\Lambda_\epsilon Q^T. \quad (17)(37)$$

That is, $P_{531}$ (L) can be viewed as the closest symmetric, real-valued matrix with minimum eigenvalue of $\in$ to $(L+L^T)/2$ as measured by the Frobenius norm.

$$B_k^j$$

can be enforced to be positive definite by learning a lower triangular matrix $$L_k^j$$

and setting $$B_k^j = P_\in(L_k^j).$$

Therefore, CG-Net layer $$Z_k^j$$

may be parameterized by a lower triangular matrix $$L_k^j$$

defining the steepest descent vector $$d_k^j(z; u) = -P_\epsilon(L_k^j)\nabla_z F(u, z). \quad (38)$$

Additionally, as $\nabla_z F(u,z)$, given by:

$$\nabla_z F(u, z) = -2A_u^T(y - A_u z) + 2\mu f'(z) \odot f(z), \quad (39)$$

depends on the regularization scalar μ, layer $$Z_k^j$$

is parameterized by regularization scalar $$\mu_k^j.$$

Furthermore, layer $$Z_k^j$$

may be parameterized by the step size $$\eta_k^{(j)},$$

which can be taken to be a diagonal matrix. That is, instead of learning a single constant to scale the steepest descent vector $$d_k^j$$

a different constant can be learned to scale each component of $$d_k^j$$

separately. Finally, layer $$Z_k^j$$

learns positive real numbers $$a_k^j > z_{min} \text{ and } b_k^j > z_{min},$$

which may be applied through the modified ReLU activation function, $$\mathcal{P}_{a_k^j, b_k^j},$$

in (35).

Fixing a small real-valued $\in > 0$, to ensure $\lambda_k > 0$ and $$a_0, b_0, a_k^j, b_k^j > z_{min}$$

in implementation, $\max\{\lambda_k, \in\}$ may be used in place of $\lambda_k$, $\max\{a_0, z_{min} + \in\}$ may be used in place of $a_0$, and similarly for $$b_0, a_k^j, \text{ and } b_k^j.$$

In total, in this example implementation, CG-Net has $$K\left(\frac{J}{2}(n(n+3)+6)\right)+3 \text{ parameters:}$$

$$\Theta = \left\{\lambda_0, a_0, b_0, \lambda_k, \mu_k^j, L_k^j, \eta_k^{(j)}, a_k^j, b_k^j\right\}_{k=1,2,\ldots,K}^{j=1,2,\ldots,J} \quad (40)$$

where n is the image size. The CG-Net parameters are trained by minimizing a loss function involving the SSIM image quality metric, such as using Eqn. (36) above for $\mathcal{B} \subset \mathcal{D}$ a batch of data points. This cost function may be optimized as described above. The gradient $\nabla_\Theta \mathcal{L}_\mathcal{B}$ for ADAM may be calculated via back-propagation through the network.

Deep Regularized CG-Net

Figure 4A:
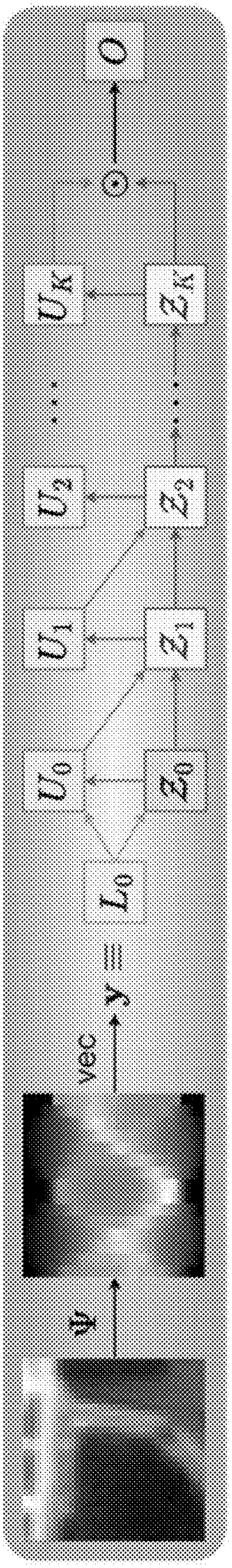
FIGS. 4A-4E show an example end-to-end network structure of a DR-CG-Net image reconstruction network in accordance with an embodiment of the present disclosure.

FIGS. 4A-4E show an example end-to-end network structure of a DR-CG-Net image reconstruction network in accordance with an embodiment of the present disclosure. FIG. 4A shows an unrolled deep neural network of Algorithm 3 described in the present disclosure. The DR-CG-Net includes an input block, $L_0$, initialization block, $Z_0$, K+1 Tikhonov blocks, $U_k$, output block, O, and K(j) complete scale variable mappings, $Z_k$, with structure shown in FIGS. 4B and 4C. Each $Z_k$ includes J updates g further detailed in FIG. 4D, for PGD, and in FIG. 4E for ISTA. Each $g^{(k)}$ includes a data fidelity gradient descent step, $r^{(j)}$ added to a convolutional neural network and corresponds to an intermediate update of the z variable.

In some embodiments, a deep regularized implementation of the CG-Net ("DR-CG-Net") described above may be implemented. In these instances, a deep neural network with end-to-end structure, such as the one shown in FIG. 4A, may be implemented. The deep neural network may be constructed by applying algorithm unrolling to the generalized CG-LS algorithm described above, or alternatively to the CG-LS algorithm described above. Instead of requiring a specified $\mathcal{R}$, DR-CG-Net learns $\mathcal{R}$ through a subnetwork representing either $\nabla\mathcal{R}$ or $\text{prox}_{\eta\mathcal{R}}$.

Let $\mathcal{V}:\mathbb{R}^n\to\mathbb{R}^n$, for k=1, 2, . . . , K and j=1, 2, . . . , J, be a subnetwork. That is, each $\mathcal{V}$ is a collection of layers mapping from $\mathbb{R}^n$ to $\mathbb{R}^n$. For example, convolutional layers may be used, making each $$\mathcal{V}_k^{(j)}$$

subnetwork a CNN. Now, the intermediate scale variable mapping, $$g_k^{(j)},$$

, can be defined as:

$$g_k^{(j)}(z,u)=\begin{cases}\mathcal{P}_{[0,\infty)}\big(r_k^{(j)}(u,z)+\mathcal{V}_k^{(j)}(z)\big) & PGD\\ \mathcal{P}_{[0,\infty)}\big(\mathcal{V}_k^{(j)}\big(r_k^{(j)}(u,z)\big)\big) & ISTA.\end{cases}\tag{41}$$

where $$r_k^{(j)}$$

is the mapping of the data fidelity gradient descent step of F(u,z) in z, $$r_k^{(j)}(u,z)=z-\eta_k^{(j)}\big(A_u^T(A_uz-y)\big)\tag{42}$$

for a step size $$\eta_k^{(j)}.$$

Note that $$g_k^{(j)}$$

corresponds to the update methods described above, where $$\mathcal{V}_k^{(j)}$$

replaces $\nabla\mathcal{R}$ and $\text{prox}_{\eta\mathcal{R}}$ in PGD or ISTA, respectively. In some implementations, $\mathcal{P}_{[0,\infty)}\equiv$ReLU may be applied to ensure all intermediate z estimates in DR-CG-Net maintain positive entries. Finally, recall the Tikhonov update defined in Eqn. (24), and let $\mathcal{T}_k(z)=\mathcal{T}(z;P_k)$ for a covariance matrix, $P_k$.

Figure 4B:
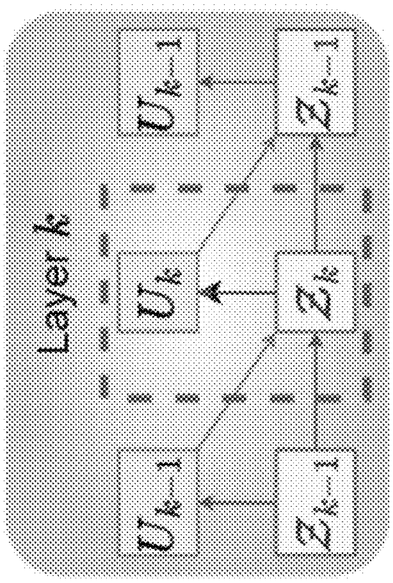
Figure 4C:
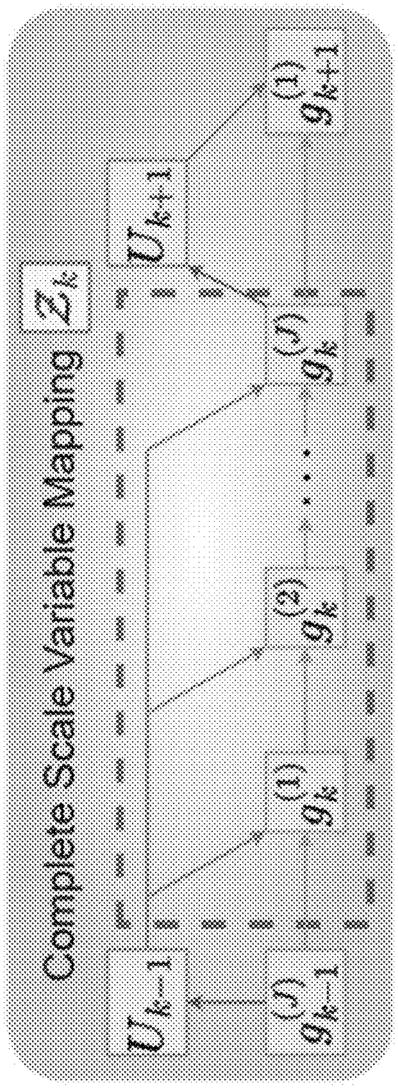
Figure 4D:
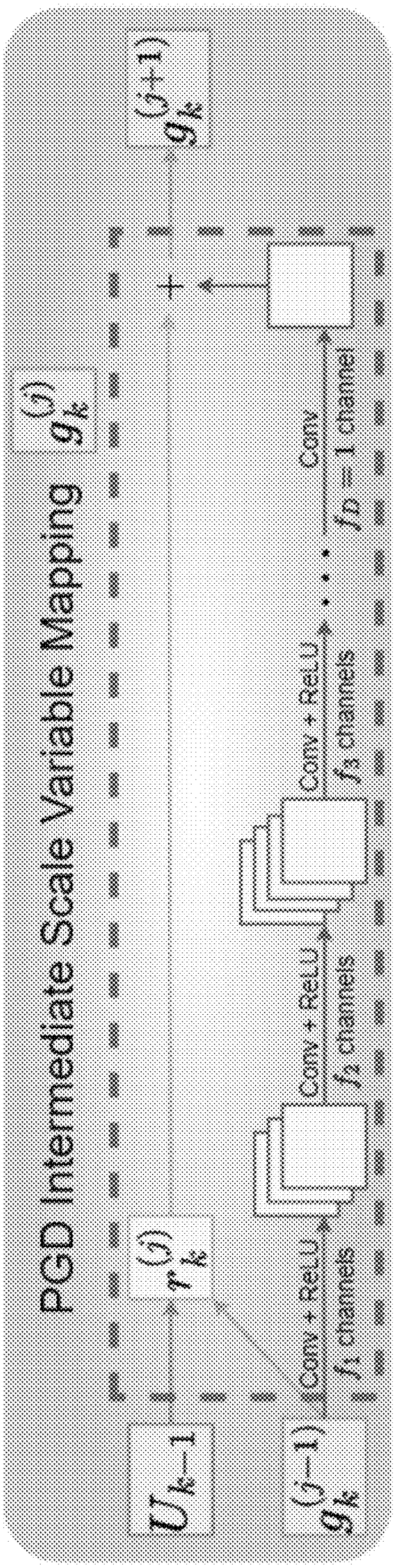
Figure 4E:
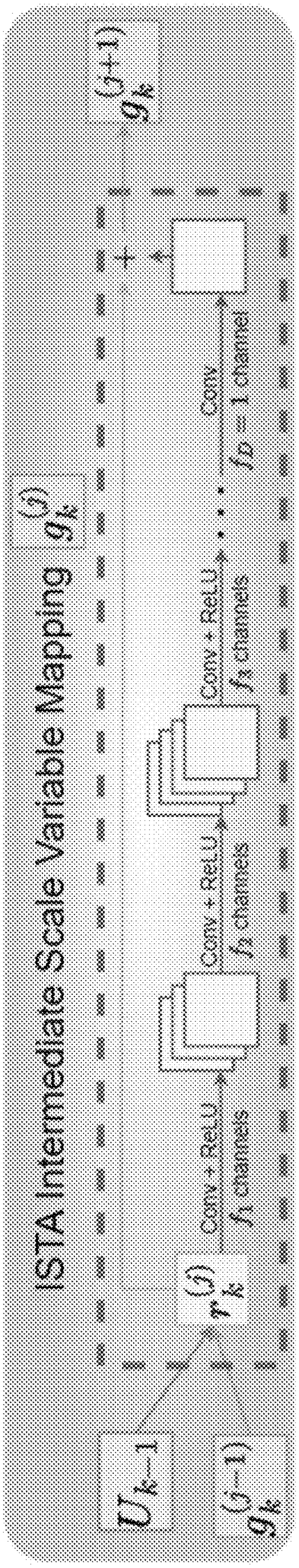

Each layer k of DR-CG-Net, shown in FIG. 4B, is broken down into a complete scale variable mapping, $\mathcal{Z}_k$ shown in FIG. 4C, and a Tikhonov update, $U_k$, so that layer k corresponds to iteration k of Algorithm 3. As in Algorithm 3, $\mathcal{Z}_k$ includes a composition of the J scale variable updates $$g_k^{(1)},\ \dots\ ,g_k^{(J)}$$

shown in FIG. 4D and FIG. 4E for PGD or ISTA, respectively.

Mathematically, the DR-CG-Net blocks may be detailed as:

$L_0$=y is the input measurements to the network;

$\mathcal{Z}_0=\mathcal{P}_{[0,b]}(A^Ty)$ is the initial estimate of z from line 1 of Algorithm 3;

$$U_k=\mathcal{T}_k\big(g_k^{(J)}\big)$$

is the u Tikhonov estimate corresponding to line 1 and 8 of Algorithm 3;

The kth complete scale variable mapping $\mathcal{Z}_k$ contains:

$$g_k^{(j)}=g_k^{(j)}\big(g_k^{(j-1)},U_{k-1}\big)$$

is the intermediate scale variable mapping analogous to $$z_k^j$$

on line 5 in Algorithm 3;

$$r_k^{(j)}=r_k^{(j)}\big(U_{k-1},g_k^{(j-1)}\big)$$

is the data fidelity gradient step; and $O=U_K\odot\mathcal{Z}_K$ is the estimated signal coefficients produced by DR-CG-Net.

Note, to simplify notation, let $$g_k^{(0)}=g_{k-1}^{(J)}.$$

Assume each subnetwork, $$\mathcal{V}_k^{(j)},$$

uses D layers, then DR-CG-Net contains K+1 estimation layers for u, KJ(D+1) layers for updating z, one input, one output, and one initialization layer. Thus, DR-CG-Net is a DNN with K(J(D+1)+1)+4 layers.

Network Parameters and Subnetwork

For every k=0, 1, . . . , K, the layer $U_k$ is parameterized by a covariance matrix, $P_k$. To reduce the number of parameters learned by the network and for consistency in $P_k$ representing the covariance matrix of u, DR-CG-Net learns a single covariance matrix P and constrains $P_1 = \ldots = P_K = P$. Furthermore, the possibility of a structured covariance matrix can be considered, where P is either a scaled identity, diagonal, tridiagonal, or full matrix. Imposing a covariance structure may be desirable or advantageous, for example to ensure only local reinforcement.

To ensure P is a covariance matrix, i.e. symmetric and positive definite, for $\epsilon > 0$ a small fixed real number, one of the following structures can be imposed:

$$P = \begin{cases} \max\{\lambda, \epsilon\} I & \text{Scaled Identity} \\ \mathrm{diag}([\max\{\lambda_i, \epsilon\}]_{i=1}^{n}) & \text{Diagonal} \\ L_{tri} L_{tri}^T + \epsilon I & \text{Tridiagonal} \\ LL^T + \epsilon I & \text{Full.} \end{cases} \tag{43}$$

In the scaled identity case, only a constant λ is learned. In the diagonal case, a vector $$\lambda = [\lambda_i]_{i=1}^{n}$$

is learned. In the tridiagonal case, two vectors $\lambda_1 \in \mathbb{R}^n$ and $\lambda_2 \in \mathbb{R}^{n-1}$ are learned and $L_{tri}$ is the lower triangular matrix formed by placing $\lambda_1$ on the diagonal and $\lambda_2$ on the first subdiagonal. Finally, in the full case, a lower triangular matrix, L, is learned.

Next, each $\mathcal{Z}_k$ is parameterized by $$\{\eta_k^{(1)}, \ldots, \eta_k^{(J)}\},$$

a collection of step sizes, as $$\eta_k^{(j)}$$

parameterizes the data fidelity gradient step, $$r_k^{(j)},$$

and the parameters of the subnetworks $$\mathcal{V}_k^{(1)}, \ldots, \mathcal{V}_k^{(J)}.$$

For fixed constant $\gamma_{max} > 0$ and fixed z and u the following is taken:

$$\eta_k^{(j)} = \delta_k^{(j)} \begin{cases} 1 & \|A_u^T(A_u z - y)\|_2 \le \gamma_{max} \\ \dfrac{\gamma_{max}}{\|A_u^T(A_u z - y)\|_2} & \text{else} \end{cases} \tag{44}$$

And let the network learn $$\delta_k^{(j)},$$

a real value parameter. This corresponds to performing a normalized step in the data fidelity gradient step. Normalizing the step size provides numerical stability in preventing the data fidelity gradient step from being too large and counterproductive.

In some implementations, $$\mathcal{W}_k^{(j)}$$

can be a CNN of depth D using ReLU activation functions. That is, layer d includines $f_d$ convolutions, i.e. filter channels, using kernel size $k_d \times k_d$ with unit stride and a bias matrix added to each filter channel. Note, zero padding may be applied to each filter channel of the input such that that the output from each filter channel is the same size as the input. Furthermore, $f_D = 1$ can be taken, such that for $X \in \mathbb{R}^{n \times n}$, $$\mathcal{W}_k^{(j)}(X) \in \mathbb{R}^{n \times n}.$$

$\in \mathbb{R}^{n \times n}$. Next, for $x \in \mathbb{R}^{n^2}$, mat(x) may be defined to be x reshaped into a n×n matrix. Similarly, for $X \in \mathbb{R}^{n \times n}$, vec(X) may be defined to be X reshaped into a vector of size $n^2$ such that vec(mat(x))=x. Then $$\mathcal{V}_k^{(j)}(x) = \begin{cases} vec(\mathcal{W}_k^{(j)}(mat(x))) & PGD \\ x + vec(\mathcal{W}_k^{(j)}(mat(x))) & ISTA. \end{cases} \tag{45}$$

For $$W_{k,d}^{(j)} \text{ and } B_{k,d}^{(j)}$$

being the convolutional kernels and biases of $$\mathcal{W}_k^{(j)},$$

respectively, the DR-CG-Net parameters are $$\Theta = \{P\} \cup \{\delta_k^{(j)}, W_{k,d}^{(j)}, B_{k,d}^{(j)}\} \begin{matrix} j = 1, 2, \ldots, J \\ k = 1, 2, \ldots, K. \\ d = 1, 2, \ldots, D \end{matrix} \tag{46}$$

Loss Function

The DR-CG-Net parameters can be trained by minimizing the mean absolute error loss function. Namely, for $\mathcal{B} \subset \mathcal{D}_s$, a batch of data points the mean absolute error loss function is $$\mathcal{L}_{\mathcal{B}}(\Theta) = \frac{1}{|\mathcal{B}|} \frac{1}{n} \sum (\overline{y}_i, \overline{c}_i) \in \mathcal{B} \|\hat{c}(\overline{y}_i; \Theta) - \overline{c}_i\|_1. \tag{47}$$

This cost function can be optimized through adaptive moment estimation (Adam), which is a stochastic, gradient-based optimizer. Other common optimization methods include stochastic gradient descent, RMSprop, and Adadelta. The gradient, $\nabla_\Theta \mathcal{L}_\mathcal{B}$, for Adam is calculated via backpropagation through the network, which can be implemented with automatic differentiation using Tensorflow.

Thus, using the powerful CG class of densities to represent image coefficients, a deep neural network named DR-CG-Net for solving linear inverse problems is provided. This deep neural network is produced by applying algorithm unrolling to the generalized CG-LS algorithm described above, which enforces the CG prior. The generalized CG-LS algorithm allows for problem-specific choices of the scale variable distribution, which subsequently is learned through the unrolled deep neural network. Hence, DR-CG-Net has the flexibility to learn the prior while still being constrained to the class of compound Gaussian distributions.

Neural Network Implementation

Figure 5:
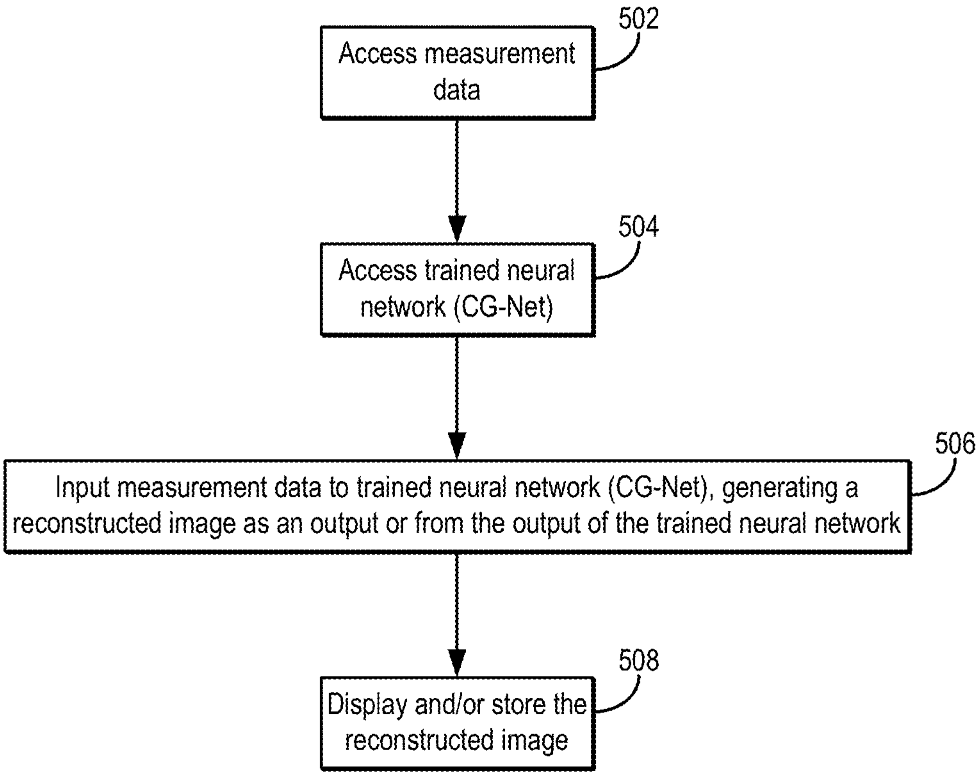
FIG. 5 is a flowchart setting forth the steps of an example method for reconstructing an image from measurement data using a CG-Net image reconstruction network in accordance with an embodiment of the present disclosure.

FIG. 5 is a flowchart setting forth the steps of an example method for reconstructing an image from measurement data using a CG-Net image reconstruction network in accordance with an embodiment of the present disclosure. Referring now to FIG. 5, a flowchart is illustrated as setting forth the steps of an example method for reconstructing an image from measurement data using a suitably trained neural network or other machine learning algorithm, such as the CG-Net neural networks described in the present disclosure. As described above, the CG-Net takes measurement data as input data and generates a reconstructed image as output data.

Accessing Data

The method includes accessing measurement data with a computer system, as indicated at step 502. Accessing the measurement data may include retrieving such data from a memory or other suitable data storage device or medium. Additionally or alternatively, accessing the measurement data may include acquiring such data with an imaging system and transferring or otherwise communicating the data to the computer system, which may be a part of the imaging system.

In one non-limiting example, the measurement data may include medical imaging data acquired with a medical imaging system. For instance, the medical imaging system may include an x-ray imaging system (e.g., a computed tomography ("CT") system), a magnetic resonance imaging ("MRI") system, a positron emission tomography ("PET") system, an ultrasound imaging system, or the like. In these instances, the measurement data may include the respective measurement data acquired by the medical imaging system. As a non-limiting example, the measurement data may include x-ray attenuation and/or photon count measurements acquired using a CT system. As another example, the measurement data may include k-space data acquired with an MRI system.

In other examples, the measurement data may include other measurement data acquired using other imaging or sensing modalities, include microwave, acoustic, optical, or otherwise.

Accessing Trained Neural Network

A trained neural network (or other suitable machine learning algorithm) is then accessed with the computer system, as indicated at step 504. Accessing the trained neural network may include accessing network parameters (e.g., weights, biases, or both) that have been optimized or otherwise estimated by training the neural network on training data. In some instances, retrieving the neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the neural network is trained, or has been trained, on training data in order to reconstruct a signal and/or image from measurement data.

Applying Data to the Neural Network

The measurement data are then input to the one or more trained neural networks, generating one or more reconstructed images as an output, as indicated at step 506. In some implementations, as described above, sparse coefficients, c, are output from the output layer of the CG-Net reconstruction network. In these instances, the reconstructed image may be recovered from the sparse coefficients, for example, by using the appropriate sparse domain transformation. For example, when the sparse domain is the wavelet domain, the CG-Net reconstruction network may output wavelet coefficients. By applying a wavelet transformation to these wavelet coefficients, the reconstructed image can be recovered.

Display and/or Store Output

The image(s) generated by inputting the measurement data to the trained neural network(s) can then be displayed to a user, stored for later use or further processing, or both, as indicated at step 508.

Neural Network Training

Figure 6:
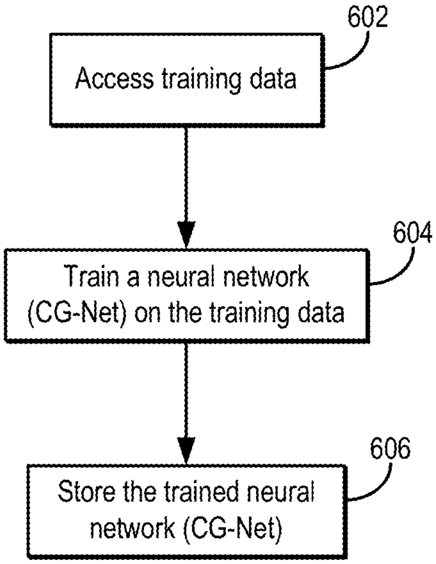
FIG. 6 is a flowchart setting forth the steps of an example method for training a CG-Net image reconstruction network on training data in accordance with an embodiment of the present disclosure.

FIG. 6 is a flowchart setting forth the steps of an example method for training a CG-Net image reconstruction network on training data in accordance with an embodiment of the present disclosure. Referring now to FIG. 6, a flowchart is illustrated as setting forth the steps of an example method for training one or more neural networks (or other suitable machine learning algorithms) on training data, such that the one or more neural networks are trained to receive measurement data as input data in order to generate reconstructed images as output data. In general, the neural network(s) implement the CG-Net architectures described above.

Accessing Training Data

The method includes accessing training data with a computer system, as indicated at step 602. Accessing the training data may include retrieving such data from a memory or other suitable data storage device or medium. Alternatively, accessing the training data may include acquiring such data with an imaging system and transferring or otherwise communicating the data to the computer system.

In general, the training data can include measurement data acquired with an imaging system and example images reconstructed from the measurement data. The method can include assembling training data from measurement data and/or images reconstructed from measurement data using a computer system. This step may include assembling the training fata into an appropriate data structure on which the neural network or other machine learning algorithm can be trained.

Training the Neural Network(s)

One or more neural networks (or other suitable machine learning algorithms) are trained on the training data, as indicated at step 604. In general, the neural network can be trained by optimizing network parameters (e.g., weights, biases, or both) based on minimizing a loss function. As one non-limiting example, the loss function may be the SSIM-based loss function described above.

Training a neural network may include initializing the neural network, such as by computing, estimating, or otherwise selecting initial network parameters (e.g., weights, biases, or both). During training, an artificial neural network receives the inputs for a training example and generates an output using the bias for each node, and the connections between each node and the corresponding weights. For instance, training data can be input to the initialized neural network, generating output as an intermediate reconstructed image. The artificial neural network then compares the generated output with the actual output of the training example in order to evaluate the quality of the intermediate reconstructed image. For instance, the intermediate reconstructed image can be passed to a loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. The training continues until a training condition is met. The training condition may correspond to, for example, a predetermined number of training examples being used, a minimum accuracy threshold being reached during training and validation, a predetermined number of validation iterations being completed, and the like. When the training condition has been met (e.g., by determining whether an error threshold or other stopping criterion has been satisfied), the current neural network and its associated network parameters represent the trained neural network. Different types of training processes can be used to adjust the bias values and the weights of the node connections based on the training examples. The training processes may include, for example, gradient descent, Newton's method, conjugate gradient, quasi-Newton, Levenberg-Marquardt, among others.

The artificial neural network can be constructed or otherwise trained using the techniques described above in more detail. In addition to learning the neural network parameters described above, in some implementations the CG-Net may be trained on training data to additionally or alternatively learn the inverse of the nonlinear function in the CG prior (i.e., $f(z)$, by approximating it with a sub-network embedded inside of CG-Net. Such an extension of CG-Net may expand its applicability by both no longer requiring a user-specified function $f$, as well as providing CG-Net with a greater learning capacity.

Storing Neural Network(s) for Later Use

The one or more trained neural networks are then stored for later use, as indicated at step 606. Storing the neural network(s) may include storing network parameters (e.g., weights, biases, or both), which have been computed or otherwise estimated by training the neural network(s) on the training data. Storing the trained neural network(s) may also include storing the particular neural network architecture to be implemented. For instance, data pertaining to the layers in the neural network architecture (e.g., number of layers, type of layers, ordering of layers, connections between layers, hyperparameters for layers) may be stored.

EXAMPLE IMPLEMENTATION

In an example study, the CG-LS algorithm in Algorithm 2 was tested using gradient descent, which may be denoted by gCG-LS, and Newton descent, which may be denoted by nCG-LS, as the steepest descent method for updating z. As an example, 32×32 images from the CIFAR10 image dataset and 64×64 images from the CalTech101 image dataset may be used. Each image was converted to a single-channel grayscale image, scaled down by the maximum pixel value, and vectorized. A Radon transform, at a specified number of angles, was performed on each image to which white noise is added producing noisy measurements, y, at a specified signal-to-noise ratio ("SNR"). Finally, a biorthogonal wavelet transformation was applied to each image to produce the sparsity coefficients, c. That is, $\Psi$ is a matrix representation of a Radon transform and $\Phi$ is a biorthogonal wavelet transformation.

For all simulations in this example, the following were used: $f(z)=\ln(z)$, $\mu=2$, $K=1000$, $J=1$, and $\delta=10^{-6}$. For measurements at an SNR of 60 dB and 40 dB, $\lambda=0.3$ and $\lambda=2$ were taken, respectively. Using nCG-LS required the Hessian of the cost function in Eqn. (9) with respect to z to be positive definite, which for $f(z)=\ln(z)$, is guaranteed when $z\in(0, e)^n$. A local minimizer can be contained in $[1, e)^n$ under sufficient scaling of the input data. Therefore, in each nCG-LS test using 32×32 or 64×64 image measurements, the input measurement was scaled by a factor, chosen empirically, of $e^{-4}$ or $e^{-6}$, respectively. Additionally, an eigendecomposition on the Hessian of the cost function in Eqn. (9) with respect to z was chosen to find the closest positive semi-definite matrix that was then used in the Newton descent step. Alternatively, the modified ReLU function $\mathcal{P}_{1,e}$ may be applied at each z update to ensure the Hessian of the cost function in Eqn. (9) with respect to z is positive semi-definite. Finally, $\mathcal{P}_{a,b}=\mathcal{P}_{1,e}$ was chosen for nCG-LS whereas for gCG-LS $\mathcal{P}_{a,b}=\neg_{1,e^2}$ was used.

In a non-limiting example, given a sensing matrix, $\Psi$, sparsity transformation, $\Phi$, and noise level in SNR, a set of training and testing measurement-coefficient pairs, (y,c), can be created as described above, that were then used to train and evaluate a CG-Net created by applying algorithm unrolling to Algorithm 2. For network size, CG-Net running on 32×32 or 64×64 image measurements use (K,J)=(20,1) or (K,J)=(5,1), respectively. The network sizes were chosen empirically such that the time to complete one image reconstruction was reasonably quick while still producing excellent reconstructions on a validation set of test images. Letting $f(z)=\ln(z)$ and initializing $a_0=1$, $b_0=\exp(2)$, every $$\eta_k^{(j)} = \frac{1}{2}I,$$

all $$\mu_k^j = 2,$$

each $$a_k^j = \frac{8}{10},$$

all $$b_k^j = \exp(3),$$

and every $$L_k^j = I.$$

Note, for CG-Net running on 32×32 images the diagonal and sub-diagonal in $$L_k^j$$

were learned, constraining $$B_k^j$$

to be a tridiagonal matrix. Finally, $\lambda_k=0.3$ was initialized for 60 dB SNR noise level and $\lambda_k=2$ was initialized all other noise levels. Each CG-Net was trained for 20 epochs, using a learning rate of $10^{-3}$, with early stopping implemented when the model overfit a validation dataset.

Figures 7A, 7B, 7C, 7D, 7E, 7F:
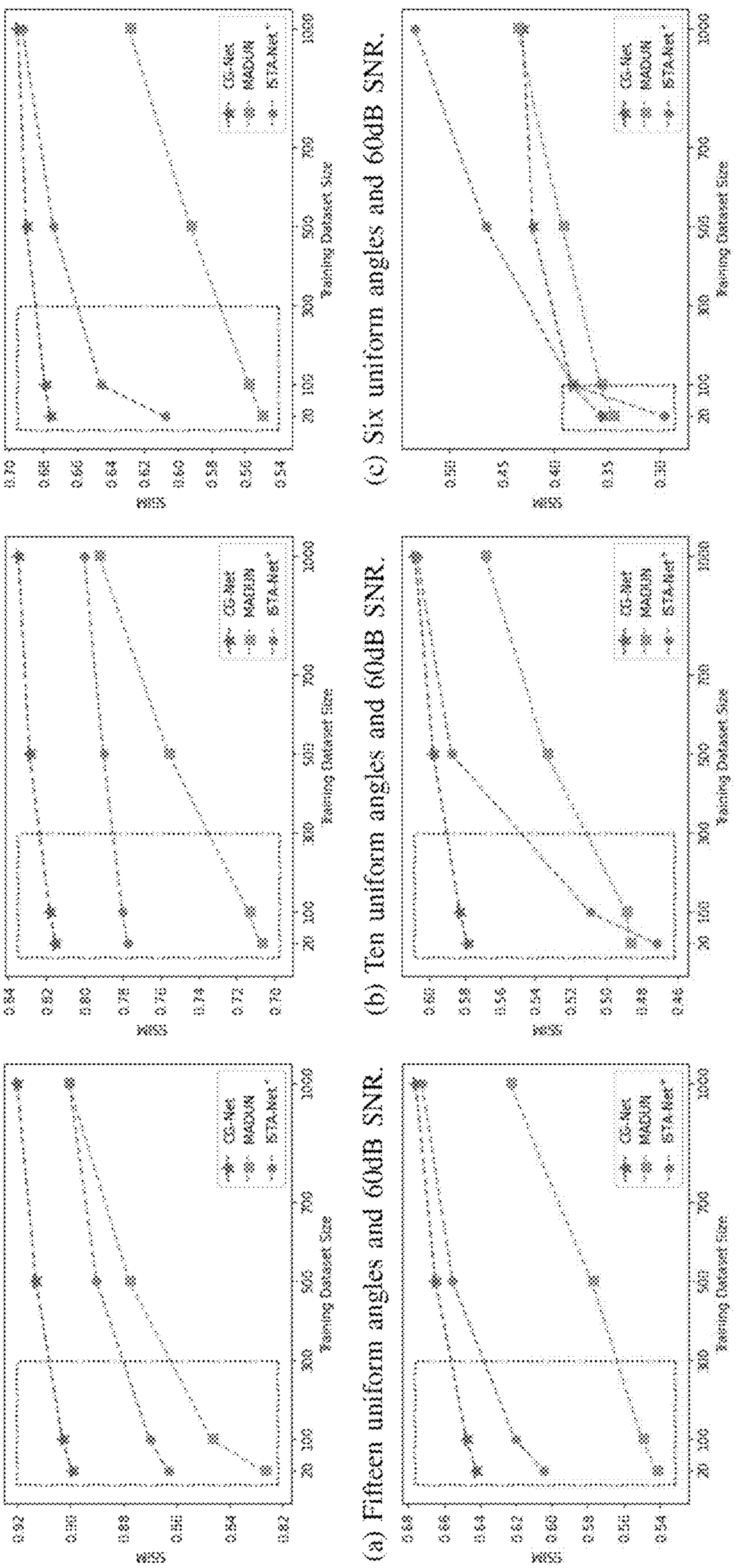
FIGS. 7A-7F show average SSIM values over 200 test image reconstructions using CG-Net, MADUN, ISTA-Net$^+$, from Radon transforms, when varying the amount of data for training in accordance with an embodiment of the present disclosure.
Figures 8A, 8B, 8C, 8D, 8E, 8F, 8G, 8H, 8I, 8J, 8K, 8L:
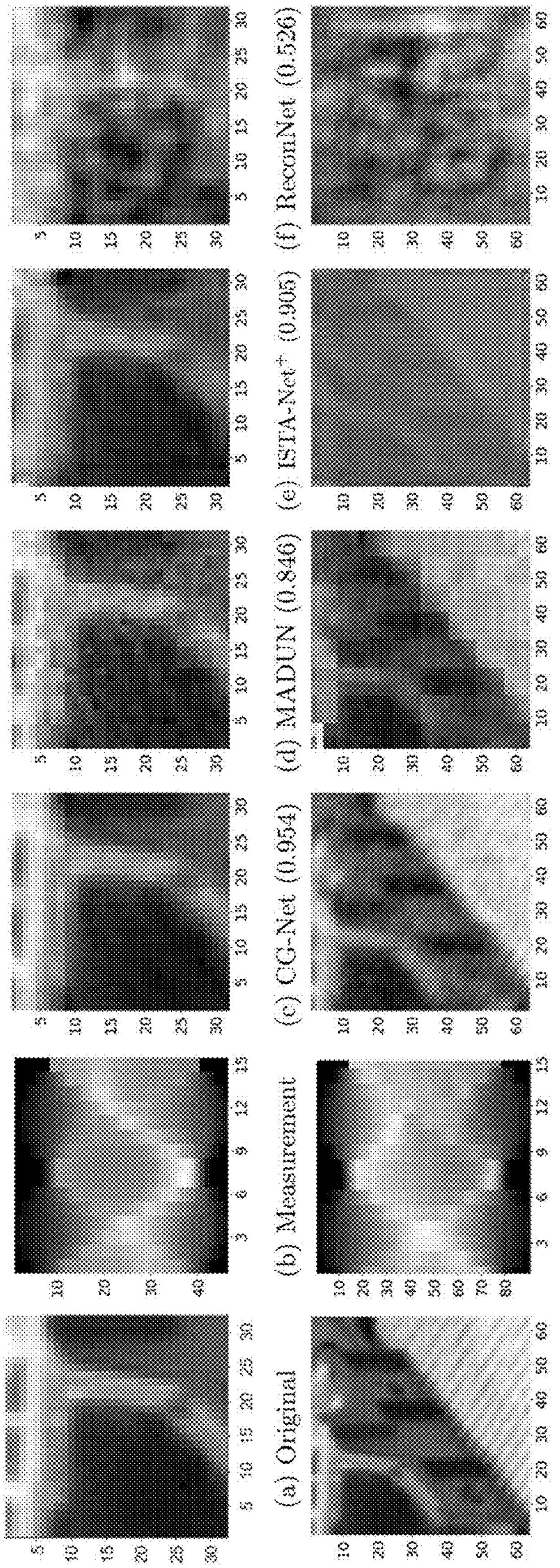
FIGS. 8A-8L show example image reconstructions (and SSIM values) using CG-Net, MADUN, ISTA-Net$^+$, and ReconNet for 32×32 and 64×64 Barbara images in accordance with an embodiment of the present disclosure.

FIGS. 7A-7F show average SSIM values over 200 test image reconstructions using CG-Net, MADUN, ISTA-Net$^{+}$, from Radon transforms, when varying the amount of data for training in accordance with an embodiment of the present disclosure. Shown in FIGS. 7A-7F is the average SSIM quality, over 200 test image reconstructions, for CG-Net, memory augmented deep unfolding network (MADUN), and ISTA-Net$^{+}$ when each is trained on a varying amount of training data. MADUN and ISTA-Net$^{+}$ are two DNNs formed by algorithm unrolling. Also compared was ReconNet, a standard CNN for image reconstructions, which was the lowest performing significantly and thus was omitted from FIGS. 7A-7F. Small sets of training data were considered, specifically of size 1000, 500, 100, and 20 pairs of measurements and coefficients. In FIGS. 7A, 7B, and 7C it can be seen that when reconstructing images from Radon transforms with a noise level of 60 dB SNR that CG-Net outperforms all comparative methods and does so significantly in low training. Similarly, in the low training and sparse sensing regimes of FIGS. 7D, 7E, and 7F, where the SNR has decreased, it can still be observed that CG-Net outperforms all comparative methods. It is contemplated that this is due to the initialization of CG-Net corresponding precisely to CG-LS and thereby incorporating the powerful statistical CG prior. Also, unlike other algorithm unrolling methods, the CG-Net does not replace any part of the optimization with a CNN, or another neural network, that is learned completely from scratch, which can often overfit quickly in low training.

FIGS. 8A-8L show example image reconstructions (and SSIM values) using CG-Net, MADUN, ISTA-Net$^{+}$, and ReconNet for 32×32 and 64×64 Barbara images in accordance with an embodiment of the present disclosure. Here, the sensing matrix, Y', is a Radon transform at 15 uniformly spaced angles and the noise level is set to 60 dB SNR. For a visual comparison of the four methods, FIG. 8 shows reconstructions, plus SSIM values, of a Barbara snippet from a Radon transform at 15 uniformly spaced angles with a noise level of 60 dB SNR. All reconstructions are performed after training on a dataset of 20 samples. In all figures, it can be seen that CG-Net produced higher quality images visually and by SSIM than the three comparison methods.

To further highlight the applicability of CG-Net, alternative sensing matrices, Ψ, and sparsity transformations, Φ may be considered other than those mentioned above. For example, in general, $\Psi \in \mathbb{R}^{m \times n}$ can be considered as a Gaussian matrix where $$\frac{m}{n}$$

is the sampling ratio. A discrete cosine transformation ("DCT") dictionary may also be considered as an alternative sparsity transformation.

Computer Systems

Figure 9:
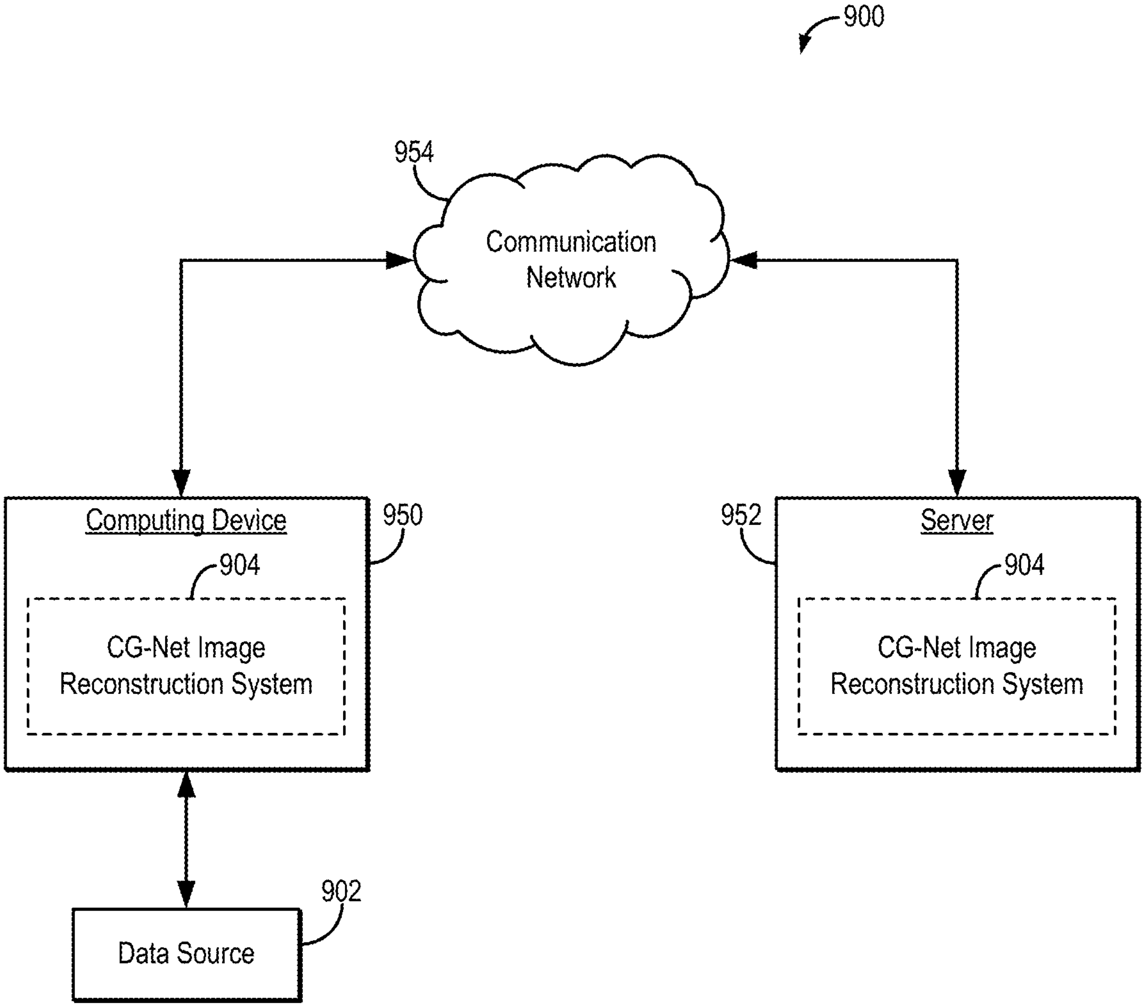
FIG. 9 is a block diagram of an example CG-Net image reconstruction system in accordance with an embodiment of the present disclosure.

FIG. 9 is a block diagram of an example CG-Net image reconstruction system in accordance with an embodiment of the present disclosure. FIG. 9 shows an example system 900 for reconstructing images using a CG-Net reconstruction network in accordance with some examples described in the present disclosure. As shown in FIG. 9, a computing device 950 can receive one or more types of data (e.g., measurement data) from data source 902. In some embodiments, computing device 950 can execute at least a portion of a CG-Net image reconstruction system 904 to reconstruct images from data received from the data source 902.

Additionally or alternatively, in some embodiments, the computing device 950 can communicate information about data received from the data source 902 to a server 952 over a communication network 954, which can execute at least a portion of the CG-Net image reconstruction system 904. In such embodiments, the server 952 can return information to the computing device 950 (and/or any other suitable computing device) indicative of an output of the CG-Net image reconstruction system 904.

In some embodiments, computing device 950 and/or server 952 can be any suitable computing device or combination of devices, such as a desktop computer, a laptop computer, a smartphone, a tablet computer, a wearable computer, a server computer, a virtual machine being executed by a physical computing device, and so on. The computing device 950 and/or server 952 can also reconstruct images from the data.

In some embodiments, data source 902 can be any suitable source of data (e.g., measurement data, images reconstructed from measurement data, processed image data), such as an imaging system, another computing device (e.g., a server storing measurement data, images reconstructed from measurement data, processed image data), and so on. In some embodiments, data source 902 can be local to computing device 950. For example, data source 902 can be incorporated with computing device 950 (e.g., computing device 950 can be configured as part of a device for measuring, recording, estimating, acquiring, or otherwise collecting or storing data). As another example, data source 902 can be connected to computing device 950 by a cable, a direct wireless link, and so on. Additionally or alternatively, in some embodiments, data source 902 can be located locally and/or remotely from computing device 950, and can communicate data to computing device 950 (and/or server 952) via a communication network (e.g., communication network 954).

In some embodiments, communication network 954 can be any suitable communication network or combination of communication networks. For example, communication network 954 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), other types of wireless network, a wired network, and so on. In some embodiments, communication network 954 can be a local area network, a wide area network, a public network (e.g., the Internet), a private or semi-private network (e.g., a corporate or university intranet), any other suitable type of network, or any suitable combination of networks. Communications links shown in FIG. 9 can each be any suitable communications link or combination of communications links, such as wired links, fiber optic links, Wi-Fi links, Bluetooth links, cellular links, and so on.

Figure 10:
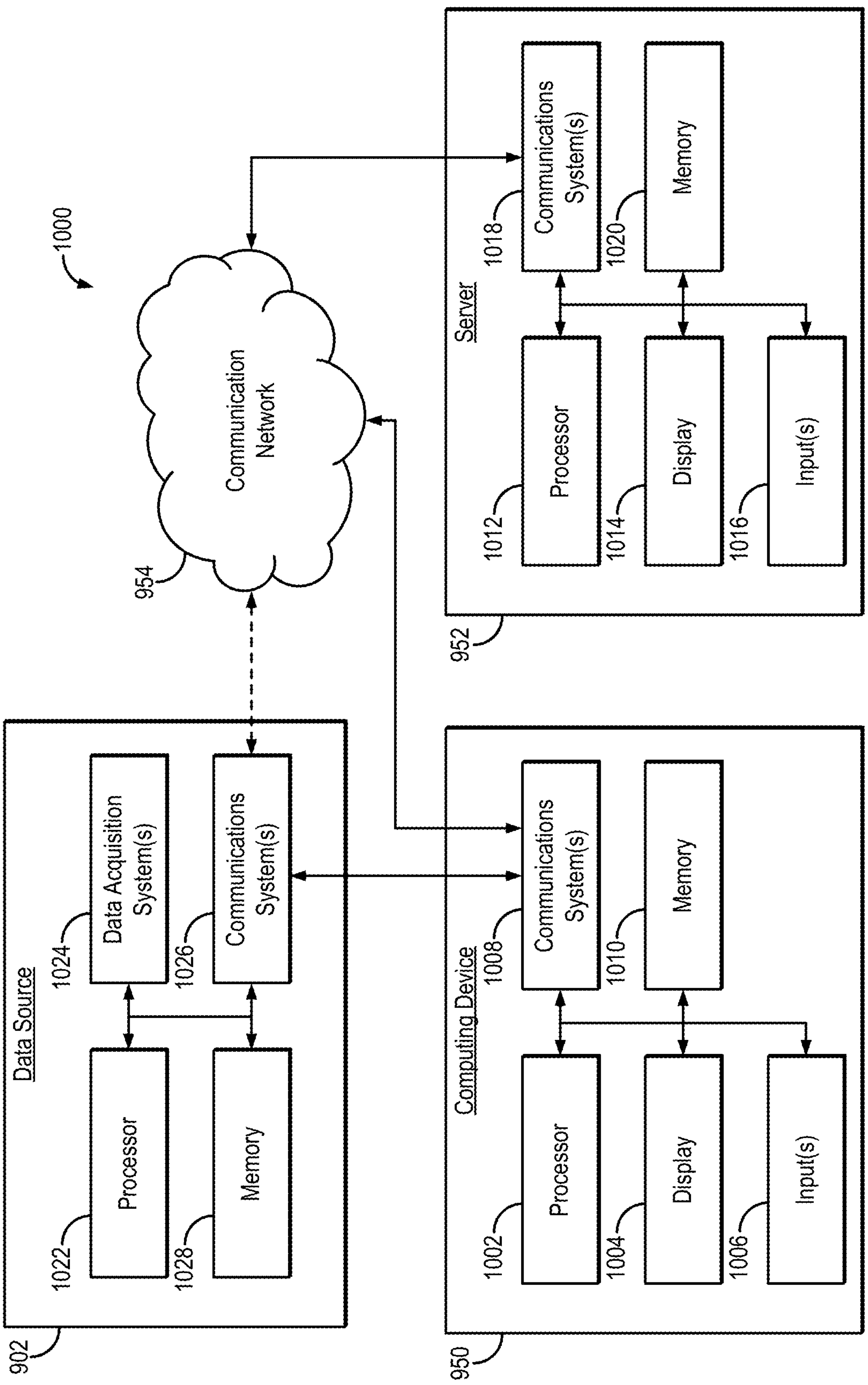
FIG. 10 is a block diagram of example components that can implement the system of FIG. 9 in accordance with an embodiment of the present disclosure.

FIG. 10 is a block diagram of example components that can implement the system of FIG. 9 in accordance with an embodiment of the present disclosure. Referring now to FIG. 10, an example of hardware 1000 that can be used to implement data source 902, computing device 950, and server 952 in accordance with some embodiments of the systems and methods described in the present disclosure is shown.

As shown in FIG. 10, in some embodiments, computing device 950 can include a processor 1002, a display 1004, one or more inputs 1006, one or more communication systems 1008, and/or memory 1010. In some embodiments, processor 1002 can be any suitable hardware processor or combination of processors, such as a central processing unit ("CPU"), a graphics processing unit ("GPU"), and so on. In some embodiments, display 1004 can include any suitable display devices, such as a liquid crystal display ("LCD") screen, a light-emitting diode ("LED") display, an organic LED ("OLED") display, an electrophoretic display (e.g., an "e-ink" display), a computer monitor, a touchscreen, a television, and so on. In some embodiments, inputs 1006 can include any suitable input devices and/or sensors that can be used to receive user input, such as a keyboard, a mouse, a touchscreen, a microphone, and so on.

In some embodiments, communications systems 1008 can include any suitable hardware, firmware, and/or software for communicating information over communication network 954 and/or any other suitable communication networks. For example, communications systems 1008 can include one or more transceivers, one or more communication chips and/or chip sets, and so on. In a more particular example, communications systems 1008 can include hardware, firmware, and/or software that can be used to establish a Wi-Fi connection, a Bluetooth connection, a cellular connection, an Ethernet connection, and so on.

In some embodiments, memory 1010 can include any suitable storage device or devices that can be used to store instructions, values, data, or the like, that can be used, for example, by processor 1002 to present content using display 1004, to communicate with server 952 via communications system(s) 1008, and so on. Memory 1010 can include any suitable volatile memory, non-volatile memory, storage, or any suitable combination thereof. For example, memory 1010 can include random-access memory ("RAM"), read-only memory ("ROM"), electrically programmable ROM ("EPROM"), electrically erasable ROM ("EEPROM"), other forms of volatile memory, other forms of non-volatile memory, one or more forms of semi-volatile memory, one or more flash drives, one or more hard disks, one or more solid state drives, one or more optical drives, and so on. In some embodiments, memory 1010 can have encoded thereon, or otherwise stored therein, a computer program for controlling operation of computing device 950. In such embodiments, processor 1002 can execute at least a portion of the computer program to present content (e.g., images, user interfaces, graphics, tables), receive content from server 952, transmit information to server 952, and so on. For example, the processor 1002 and the memory 1010 can be configured to perform the methods described herein (e.g., Algorithm 1 described above, Algorithm 2 described above, the CG-Net reconstruction network shown in FIGS. 2 and/or 3A-3C, the method of FIG. 5, the method of FIG. 6).

In some embodiments, server 952 can include a processor 1012, a display 1014, one or more inputs 1016, one or more communications systems 1018, and/or memory 1020. In some embodiments, processor 1012 can be any suitable hardware processor or combination of processors, such as a CPU, a GPU, and so on. In some embodiments, display 1014 can include any suitable display devices, such as an LCD screen, LED display, OLED display, electrophoretic display, a computer monitor, a touchscreen, a television, and so on. In some embodiments, inputs 1016 can include any suitable input devices and/or sensors that can be used to receive user input, such as a keyboard, a mouse, a touchscreen, a microphone, and so on.

In some embodiments, communications systems 1018 can include any suitable hardware, firmware, and/or software for communicating information over communication network 954 and/or any other suitable communication networks. For example, communications systems 1018 can include one or more transceivers, one or more communication chips and/or chip sets, and so on. In a more particular example, communications systems 1018 can include hardware, firmware, and/or software that can be used to establish a Wi-Fi connection, a Bluetooth connection, a cellular connection, an Ethernet connection, and so on.

In some embodiments, memory 1020 can include any suitable storage device or devices that can be used to store instructions, values, data, or the like, that can be used, for example, by processor 1012 to present content using display 1014, to communicate with one or more computing devices 950, and so on. Memory 1020 can include any suitable volatile memory, non-volatile memory, storage, or any suitable combination thereof. For example, memory 1020 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1020 can have encoded thereon a server program for controlling operation of server 952. In such embodiments, processor 1012 can execute at least a portion of the server program to transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone), and so on.

In some embodiments, the server 952 is configured to perform the methods described in the present disclosure. For example, the processor 1012 and memory 1020 can be configured to perform the methods described herein (e.g., Algorithm 1 described above, Algorithm 2 described above, the CG-Net reconstruction network shown in FIGS. 2 and/or 3A-3C, the method of FIG. 5, the method of FIG. 6).

In some embodiments, data source 902 can include a processor 1022, one or more data acquisition systems 1024, one or more communications systems 1026, and/or memory 1028. In some embodiments, processor 1022 can be any suitable hardware processor or combination of processors, such as a CPU, a GPU, and so on. In some embodiments, the one or more data acquisition systems 1024 are generally configured to acquire data, images, or both, and can include an imaging system. Additionally or alternatively, in some embodiments, the one or more data acquisition systems 1024 can include any suitable hardware, firmware, and/or software for coupling to and/or controlling operations of an imaging system. In some embodiments, one or more portions of the data acquisition system(s) 1024 can be removable and/or replaceable.

Note that, although not shown, data source 902 can include any suitable inputs and/or outputs. For example, data source 902 can include input devices and/or sensors that can be used to receive user input, such as a keyboard, a mouse, a touchscreen, a microphone, a trackpad, a trackball, and so on. As another example, data source 902 can include any suitable display devices, such as an LCD screen, an LED display, an OLED display, an electrophoretic display, a computer monitor, a touchscreen, a television, etc., one or more speakers, and so on.

In some embodiments, communications systems 1026 can include any suitable hardware, firmware, and/or software for communicating information to computing device 950 (and, in some embodiments, over communication network 954 and/or any other suitable communication networks). For example, communications systems 1026 can include one or more transceivers, one or more communication chips and/or chip sets, and so on. In a more particular example, communications systems 1026 can include hardware, firmware, and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1028 can include any suitable storage device or devices that can be used to store instructions, values, data, or the like, that can be used, for example, by processor 1022 to control the one or more data acquisition systems 1024, and/or receive data from the one or more data acquisition systems 1024; to generate images from data; present content (e.g., data, images, a user interface) using a display; communicate with one or more computing devices 950; and so on. Memory 1028 can include any suitable volatile memory, non-volatile memory, storage, or any suitable combination thereof. For example, memory 1028 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1028 can have encoded thereon, or otherwise stored therein, a program for controlling operation of data source 902. In such embodiments, processor 1022 can execute at least a portion of the program to generate images, transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone, etc.), and so on.

In some embodiments, any suitable computer-readable media can be used for storing instructions for performing the functions and/or processes described herein. For example, in some embodiments, computer-readable media can be transitory or non-transitory. For example, non-transitory computer-readable media can include media such as magnetic media (e.g., hard disks, floppy disks), optical media (e.g., compact discs, digital video discs, Blu-ray discs), semiconductor media (e.g., RAM, flash memory, EPROM, EEPROM), any suitable media that is not fleeting or devoid of any semblance of permanence during transmission, and/or any suitable tangible media. As another example, transitory computer-readable media can include signals on networks, in wires, conductors, optical fibers, circuits, or any suitable media that is fleeting and devoid of any semblance of permanence during transmission, and/or any suitable intangible media.

As used herein in the context of computer implementation, unless otherwise specified or limited, the terms "component," "system," "module," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

The present disclosure has described one or more preferred embodiments, and it should be appreciated that many equivalents, alternatives, variations, and modifications, aside from those expressly stated, are possible and within the scope of the invention.

Exemplary Image Estimation System

Figure 11:
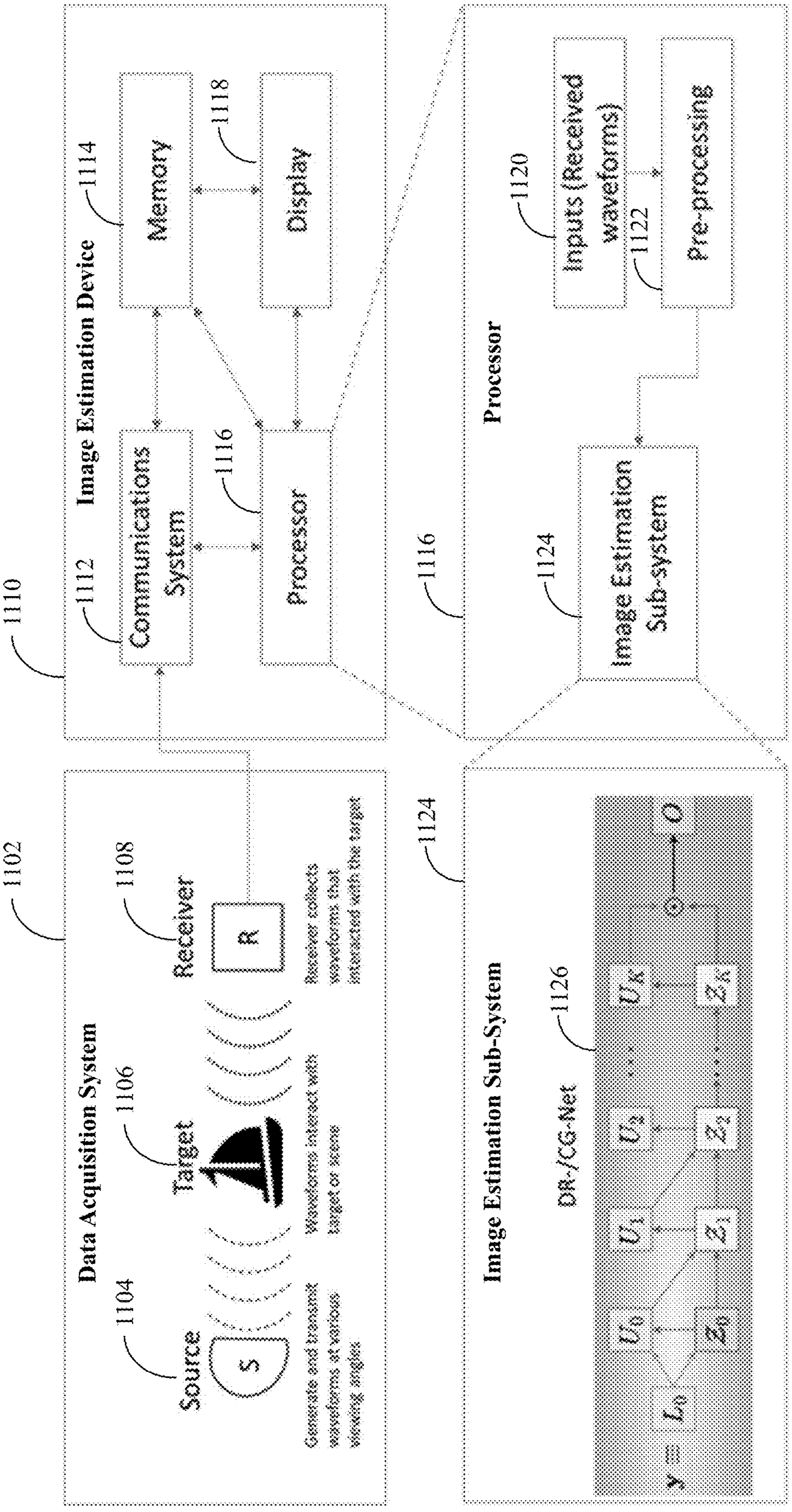
FIG. 11 is a diagram of an exemplary image estimation system in accordance with an embodiment of the present disclosure.

FIG. 11 is a diagram of an exemplary image estimation system in accordance with an embodiment of the present disclosure. In FIG. 11, data acquisition system 1102 shows a source 1104, a target 1106, and a receiver 1108. In FIG. 11, source 1104 generates and transmits waveforms at one or more viewing angles towards target 1106. The waveforms generated by source 1104 interact with target 1106 and/or a scene including target 1106. The waveforms that interacted with target 1106 and/or a scene including target 1106 are received by receiver 1108, which collects these waveforms and sends them to an image estimation device 1110.

In an embodiment, source 1104, receiver 1108, and/or image estimation device 1110 can be implemented using a single device or multiple devices. In an embodiment, source 1104, receiver 1108, and/or image estimation device 1110 can be implemented as standalone devices or integrated into one or more host devices. For example, in an embodiment, source 1104, receiver 1108, and image estimation device 1110 are all integrated into a single host device. In an embodiment, image estimation device 1110 is implemented as a standalone device. For example, in an embodiment, image estimation device 1110 is integrated into a host platform, such as a building, vehicle, ship, unmanned aerial vehicle (UAV). In an embodiment, both receiver 1108 and image estimation device 1110 are integrated into the same host platform.

In an embodiment, image estimation device 1110 includes communications system 1112, a memory 1114, a processor 1116, and a display 1118. In an embodiment, communications system 1112 receives the waveforms collected by receiver 1108, optionally stores them in memory 1114, and sends them to processor 1116. As shown in FIG. 11, processor 1106 inputs received waveforms 1120, performs pre-processing 1122, and sends the pre-processed waveforms to an image estimation sub-system 1124. As shown in FIG. 11, image estimation sub-system 1124 performs image estimation using methods in accordance with embodiments of the present disclosure (e.g., DR-/CG-Net 1126), which will be explained in further detail below. Image estimation sub-system 1224 generates an image based on the waveforms sent by receiver 1108 to image estimation device 1110 and generates an estimated image, which image estimation device 1110 can output to display 1118. For example, in an embodiment, the image generated by image estimation sub-system 1224 can be an estimated image of target 1106 and/or a scene including target 1106 that is generated based on information in the waveform received by receiver 1108.

In an embodiment, image estimation device 1110 recovers an image x=@c from undersampled measurements y by recovering c in the equation:

$$y = \Psi x + v \equiv \Psi\Phi c + v \equiv Ac + v \tag{48}$$

In Equation (48), Φ represents a dictionary to represent the image (Wavelets, discrete cosine), Ψ' represents a measurement matrix (e.g., represents the sensor), A=ΨΦ represents an effective measurement matrix, and ν represents additive noise. For example, in an embodiment, image estimation sub-system 1124 of image estimation device 1110 uses waveforms collected by receiver 1108 to recovers an image x=Φc from undersampled measurements y by recovering c in Equation (48). In an embodiment, image estimation device 1110 represents c via Compound Gaussian (CG) prior (subsumes many commonly used priors in image estimation e.g., Laplace, Student's t) according to the equation:

$$c = z \odot u \tag{49}$$

In Equation (49), u is Gaussian random vector, and z a positive non-Gaussian random vector. In an embodiment, the method of FIG. 12 estimates both z and u by minimizing the cost function according to the equation:

$$\|y - A(z \odot u)\|_2^2 + \lambda\|u\|_2^2 + R(z) \tag{50}$$

In Equation (50), the term $$\|y - A(z \odot u)\|_2^2$$

encourages that the estimates fit the observed measurements, the term $$\|u\|_2^2$$

encourages u to be Gaussian, and the term R(z) encourages a prior distribution on z. In an embodiment, image estimation device 1110 estimates z and u (to in-turn estimate c) by minimizing Equation (50). In an embodiment, image estimation device 1110 uses a CG-Net deep neural network (DNN) imaging subsystem by unrolling the imaging method in Equation (50) with $$R(z) = \mu\|\log z\|_2^2.$$

In an embodiment, an optimization landscape is learned by the DNN. In an embodiment, image estimation device 1110 uses a DR-CG-Net DNN imaging subsystem by unrolling the imaging method in Equation (50). In an embodiment, prior distribution for z will be learned by learning R(z).

Figure 12:
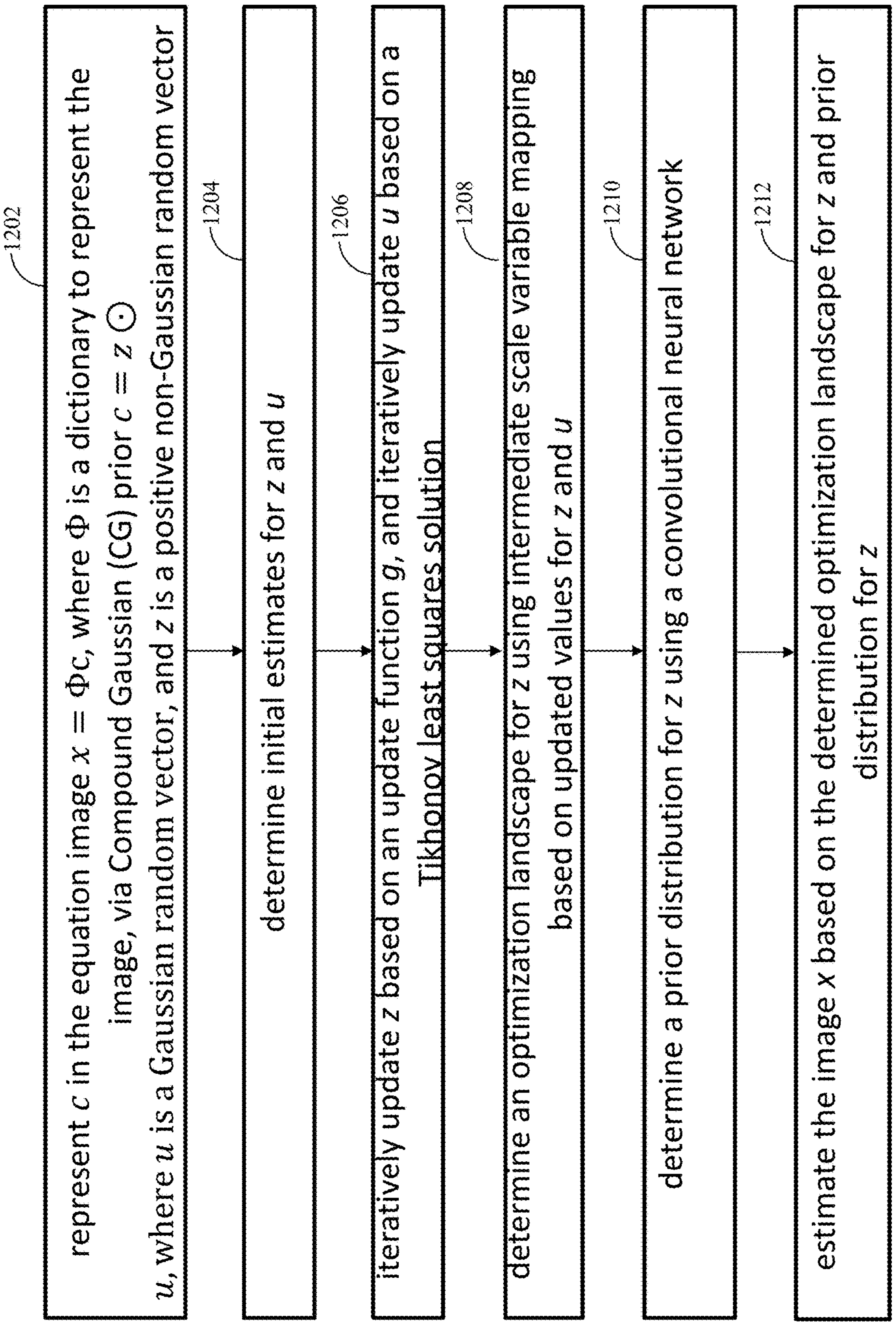
FIG. 12 is a flowchart of an exemplary method for image estimation in accordance with an embodiment of the present disclosure.

FIG. 12 is a flowchart of an exemplary method for image estimation in accordance with an embodiment of the present disclosure (e.g., in an embodiment, DR-/CG-Net 1126). In step 1202, c is represented in the equation image x=Φc, where Φ is a dictionary to represent the image, via Compound Gaussian (CG) prior c=z⊙u, where u is a Gaussian random vector, and z is a positive non-Gaussian random vector. For example, in an embodiment, image estimation device 1110 represents c in the equation image x=Φc via Compound Gaussian (CG) prior c=z⊙u. In step 1204, initial estimates for z and u are determined. For example, in an embodiment, image estimation device 1110 determines initial estimates for z and u. In step 1206, z is iteratively updated based on an update function g, and u is iteratively updated based on a Tikhonov least squares solution. For example, in an embodiment, image estimation device 1110 iteratively updates z and u. In step 1208, an optimization landscape is determined for z using intermediate scale variable mapping based on updated values for z and u. For example, in an embodiment, image estimation device 1110 determines an optimization landscape for z. In step 1210, a prior distribution for z is determined using a convolutional neural network. For example, in an embodiment, image estimation device 1110 determines a prior distribution for z. In step 1212, the image x is estimated based on the determined optimization landscape for z and prior distribution for z. For example, in an embodiment, image estimation device 1110 estimates the image x.

Figure 13:
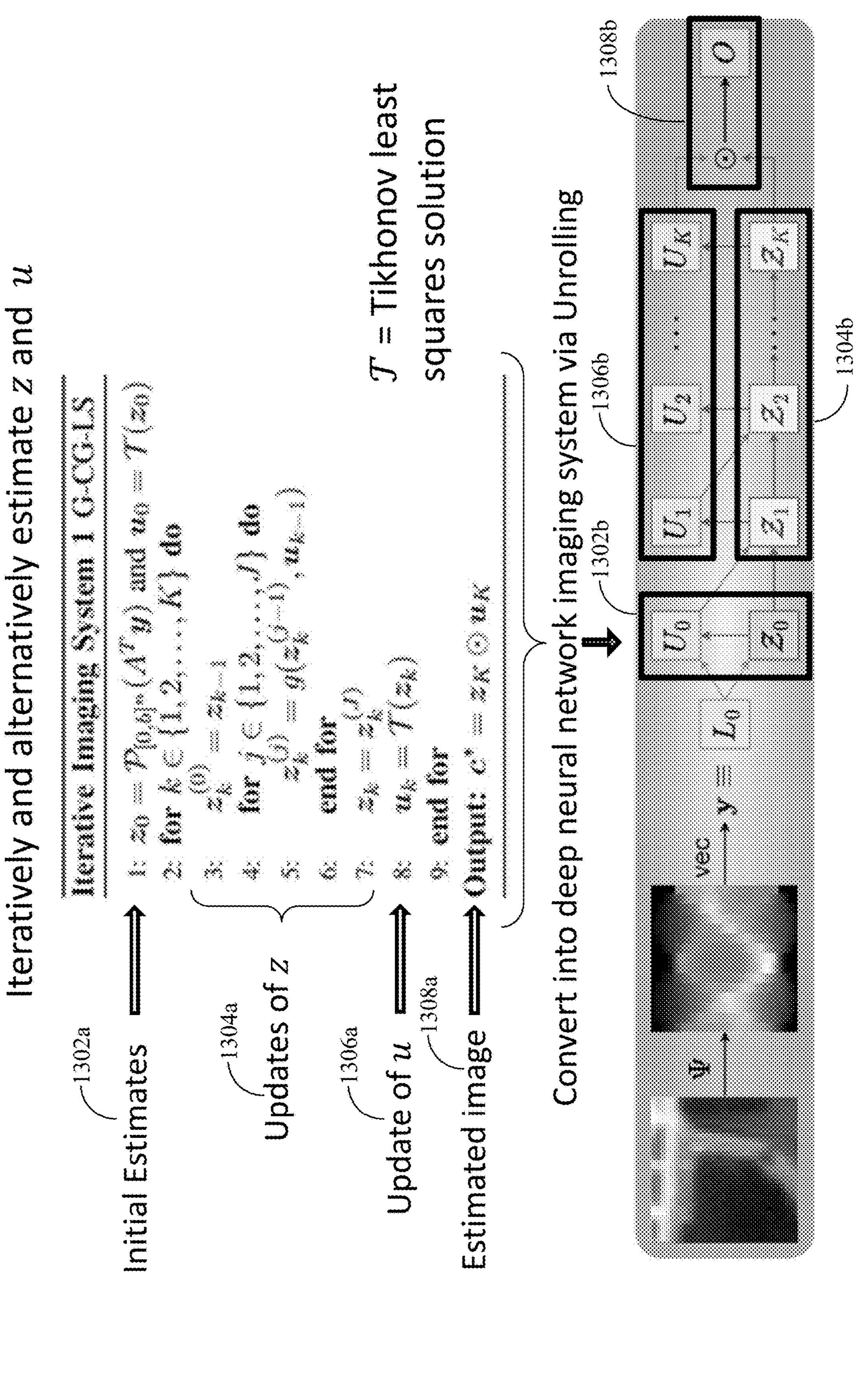
FIG. 13 is a diagram illustrating iteratively and alternatively estimating z and u and converting them into a deep neural network imaging system via unrolling in accordance with an embodiment of the present disclosure.

FIG. 13 is a diagram illustrating iteratively and alternatively estimating z and u and converting them into a deep neural network imaging system via unrolling in accordance with an embodiment of the present disclosure. FIG. 13 shows initial estimates 1302*a* and 1302*b* for $z_0$ and $u_0$, updates of z 1304*a* and 1304*b*, updates of u 1306*a* and 1306*b*, and an output estimated image 1308*a* and 1308*b*.

Figure 14:
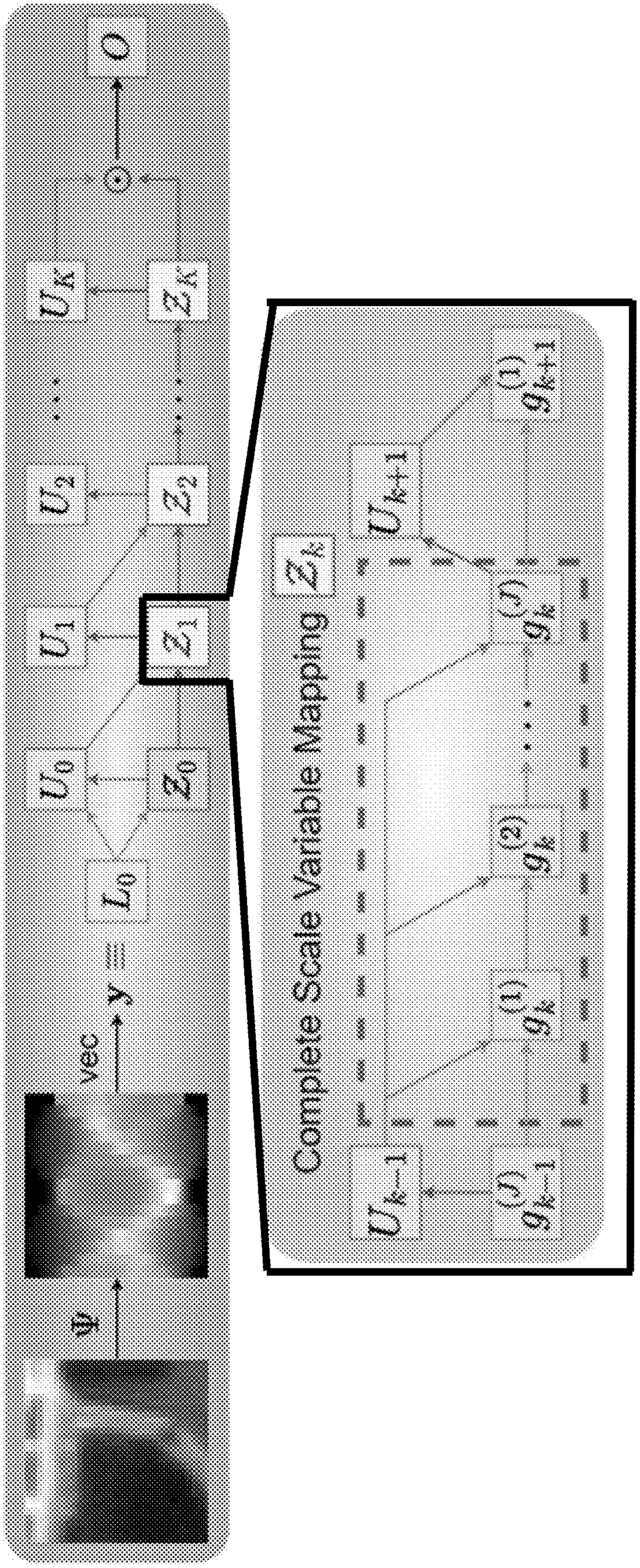
FIG. 14 is a diagram illustrating complete scale variable mapping for each $z_k$ in accordance with an embodiment of the present disclosure.
Figure 15:
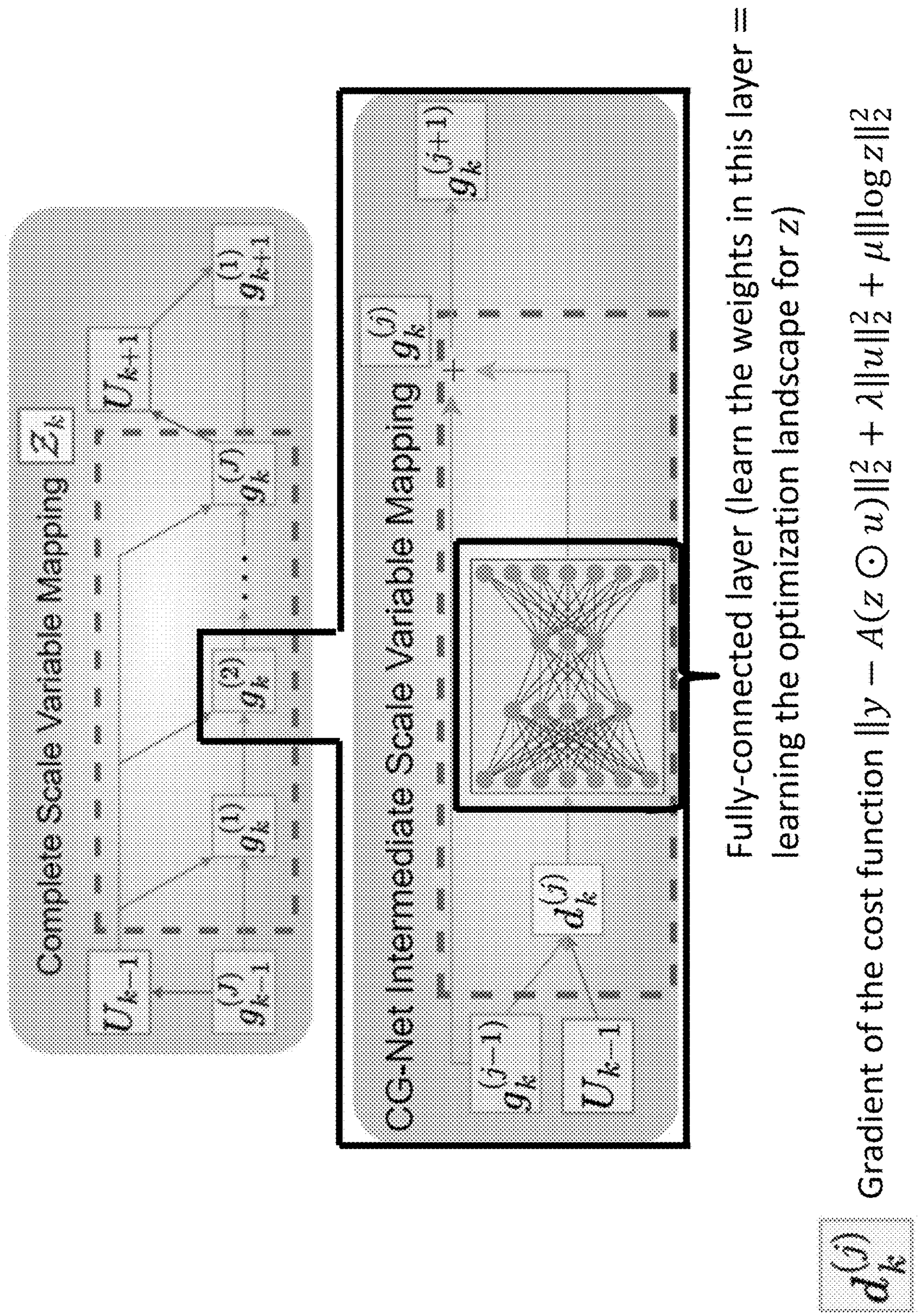
FIG. 15 is a diagram illustrating CG-Net intermediate scale variable mapping in accordance with an embodiment of the present disclosure.
Figure 16:
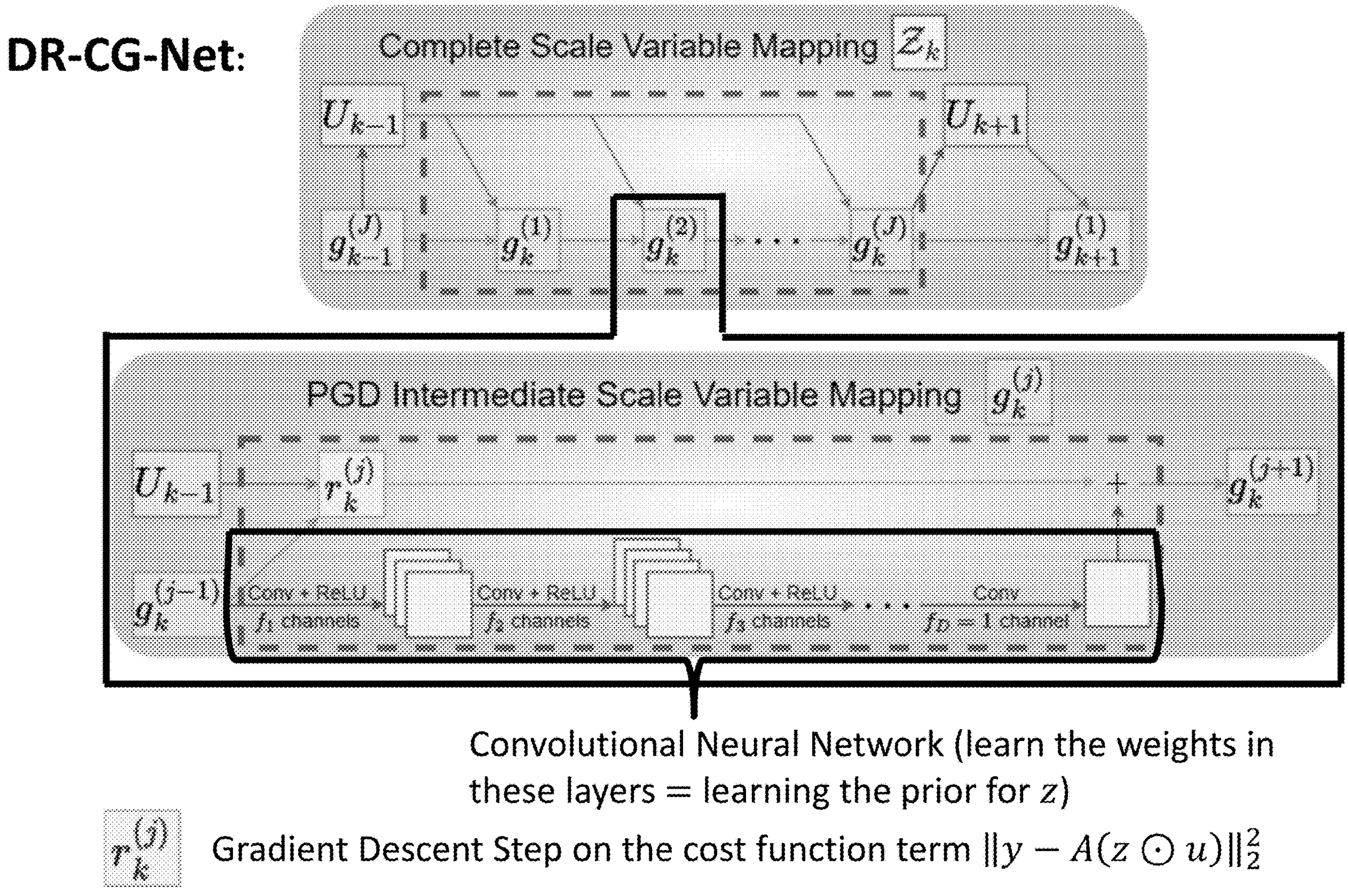
FIG. 16 is a diagram illustrating PGD intermediate scale variable mapping in accordance with an embodiment of the present disclosure.

FIG. 14 is a diagram illustrating complete scale variable mapping for each $z_k$ in accordance with an embodiment of the present disclosure. FIG. 15 is a diagram illustrating CG-Net intermediate scale variable mapping in accordance with an embodiment of the present disclosure. FIG. 16 is a diagram illustrating PGD intermediate scale variable mapping in accordance with an embodiment of the present disclosure.

Figure 17:
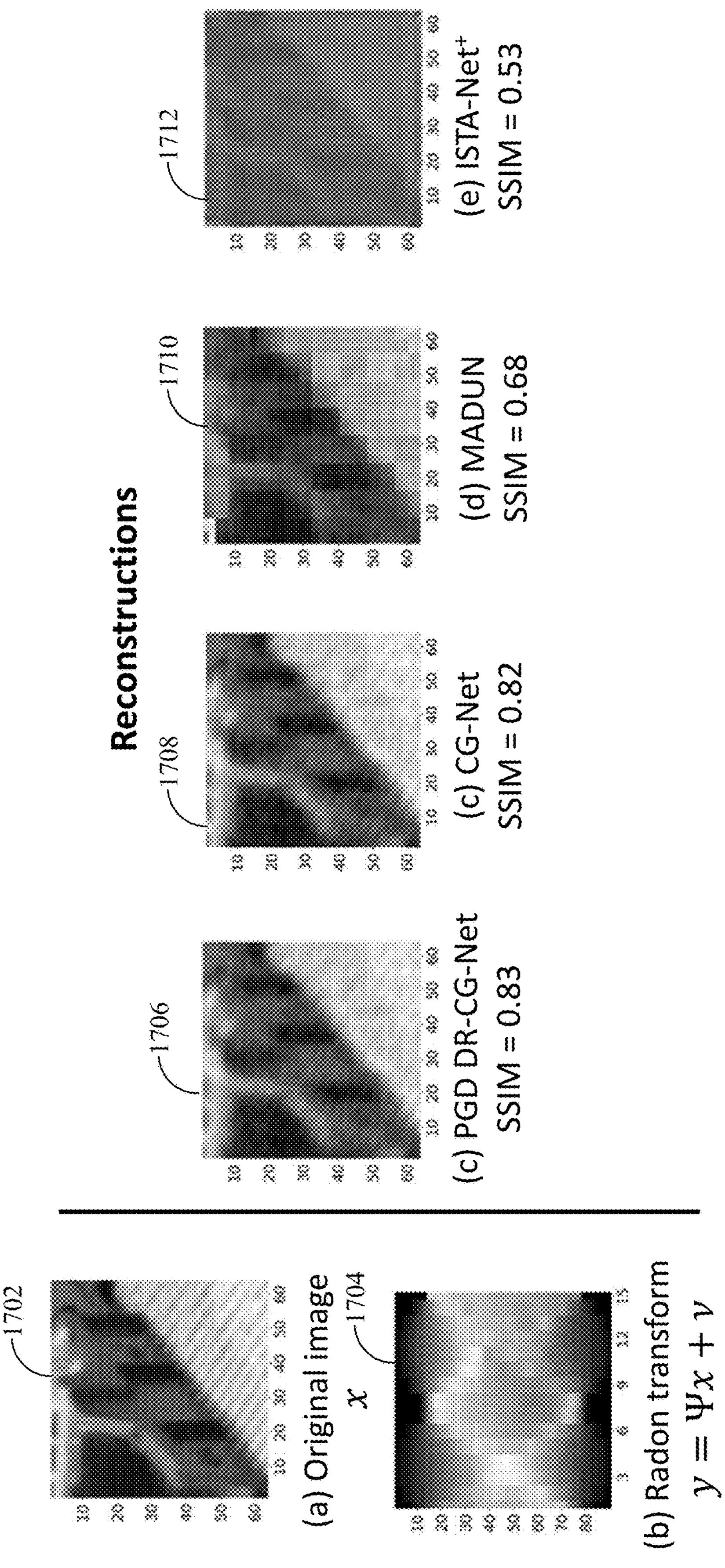
FIG. 17 shows exemplary image reconstructions in accordance with an embodiment of the present disclosure.

FIG. 17 shows exemplary image reconstructions in accordance with an embodiment of the present disclosure. For example, FIG. 17 shows original image x 1702 and radon transform $y=\Psi x+v$ 1704. FIG. 17 shows 4 reconstructions, including a reconstruction using PGD DR-CG-Net 1706 in accordance with an embodiment of the present disclosure, a reconstruction using CG-Net 1708, a reconstruction using MADUN 1710, and a reconstruction using ISTA-Net$^{+}$ 1712. As shown in FIG. 17, the reconstruction using PGD DR-CG-Net 1706 in accordance with an embodiment of the present disclosure has the highest structural similarity index measure (SSIM).

Figure 18:
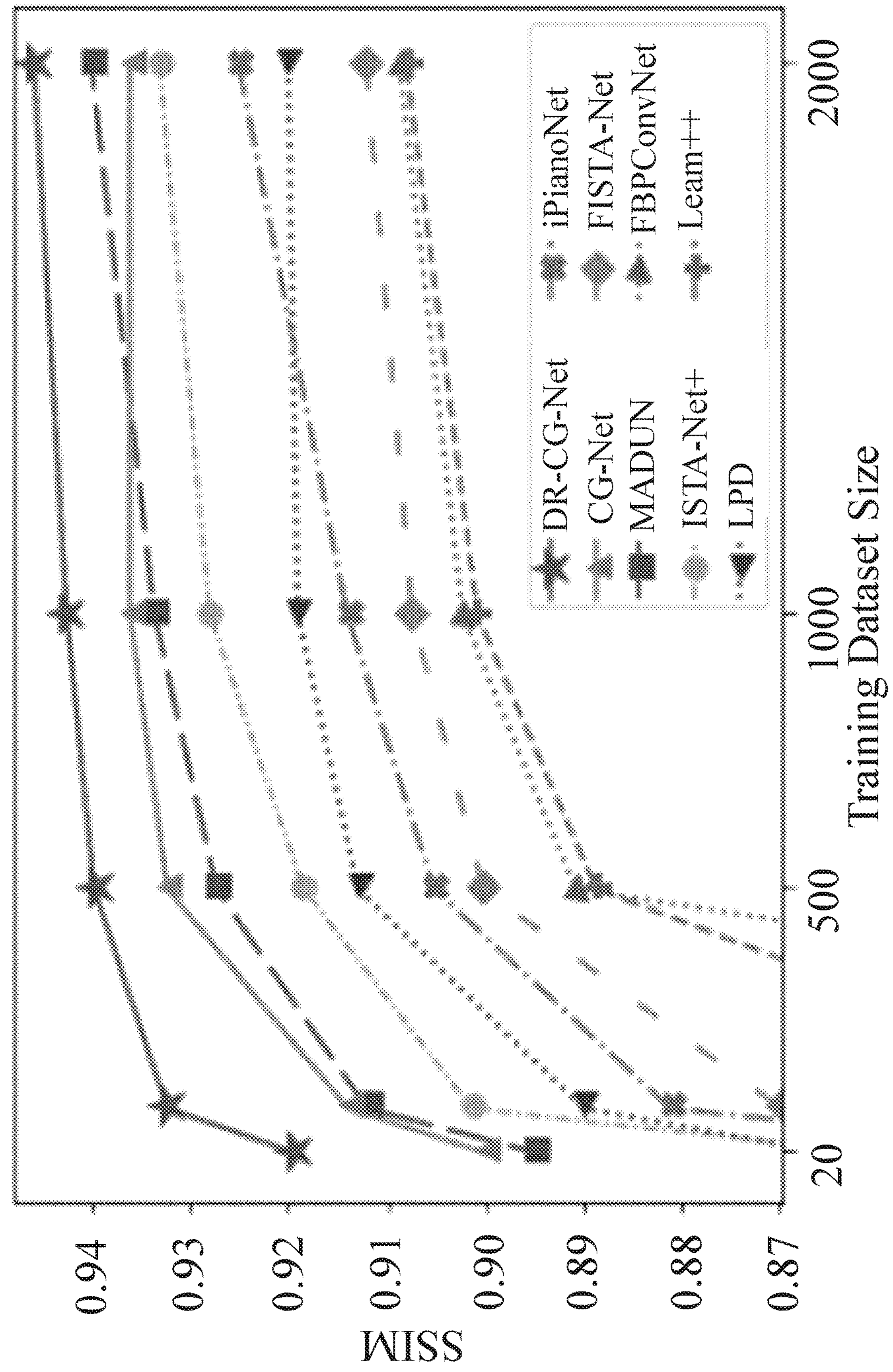
FIG. 18 is a diagram showing exemplary training dataset size vs. structural similarity index measure (SSIM) for a variety of image reconstruction techniques in accordance with an embodiment of the present disclosure.

FIG. 18 is a diagram showing exemplary training dataset size vs. structural similarity index measure (SSIM) for a variety of image reconstruction techniques in accordance with an embodiment of the present disclosure. As shown in FIG. 18, DR-CG-Net in accordance with an embodiment of the present disclosure has the highest SSIM.

CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An image estimation device, comprising:

a communications system configured to receive, from a receiver, a waveform that interacted with an object; and a processor configured to:

receive the waveform;

represent c in an equation image $x=\Phi c$, wherein $\Phi$ is a dictionary to represent the image x, via Compound Gaussian (CG) prior $c=z\odot u$, where u is a Gaussian random vector, and z is a positive non-Gaussian random vector, determine initial estimates for z and u, iteratively update z based on an update function g, iteratively update u based on a Tikhonov least squares solution, determine an optimization landscape for z using intermediate scale variable mapping based on updated values for z and u, determine a prior distribution for z using a convolutional neural network, estimate the image x based on the determined optimization landscape for z and prior distribution for z, wherein the image x is an image of the object, generate an estimated image x based on the determined optimization landscape, and output the estimated image x to a display device.

2. The image estimation device of claim 1, wherein the processor is further configured to estimate z and u by minimizing a cost function.

3. The image estimation device of claim 2, wherein the cost function is represented by $$\|y-A(z\odot u)\|_2^2+\lambda\|u\|_2^2+R(z),$$

wherein the term $$\|y - A(z \odot u)\|_2^2$$

encourges estimates for z and u to fit observed measurements, the term $$\|u\|_2^2$$

encourages u to be Gaussian, and the term R(z) encourages a prior distribution on z.

4. The image estimation device of claim 3, wherein the processor is configured to determine the prior distribution for z using a convolutional neural network based on an equation $$R(z) = \mu\|\log z\|_2^2.$$

5. The image estimation device of claim 3, wherein the processor is configured to determine the prior distribution for z based by learning R(z).

6. The image estimation device of claim 1, wherein the processor is configured to estimate the image using a neural network.

7. The image estimation device of claim 6, wherein the neural network comprises an input layer, an initialization layer, a plurality of update layers, a plurality of descent update layers, and an output layer.

8. The image estimation device of claim 7, wherein each of the plurality of descent update layers implements a Newton descent update.

9. The image estimation device of claim 7, wherein the output layer generates sparse domain coefficients as an output, and wherein the processor is configured to estimate the image based on the sparse domain coefficients.

10. The image estimation device of claim 9, wherein the processor is configured to apply a sparsity transform to the sparse domain coefficients.

11. The image estimation device of claim 10, wherein the sparse domain coefficients are wavelet coefficients, and the sparsity transform is a wavelet transform.

12. The image estimation device of claim 10, wherein the sparse domain coefficients are discrete cosine coefficients, and the sparsity transform is a discrete cosine transform.

13. The image estimation device of claim 6, wherein the neural network comprises a scale variable mapping that is learned via an unrolled iterative reconstruction algorithm.

14. The image estimation device of claim 13, wherein the unrolled iterative reconstruction algorithm comprises an unrolled generalized compound Gaussian least squares iterative reconstruction algorithm.

15. The method of claim 13, wherein the scale variable mapping is implemented as a projected gradient descent intermediate scale variable mapping.

16. The method of claim 13, wherein the scale variable mapping is implemented as an iterative shrinkage and thresholding intermediate scale variable mapping.

17. An image estimation system, comprising:

a source configured to transmit a first waveform towards an object;

a receiver configured to receive a second waveform that interacted with the object; and a processor configured to:

represent c in an equation image x=Φc, wherein Φ is a dictionary to represent the image x, via Compound Gaussian (CG) prior c=z⊙u, where u is a Gaussian random vector, and z is a positive non-Gaussian random vector, determine initial estimates for z and u, iteratively update z based on an update function g, iteratively update u based on a Tikhonov least squares solution, determine an optimization landscape for z using intermediate scale variable mapping based on updated values for z and u, determine a prior distribution for z using a convolutional neural network, estimate the image x based on the determined optimization landscape for z and prior distribution for z, wherein the image x is an image of the object, generate an estimated image x based on the determined optimization landscape, and output the estimated image x to a display device.

18. A method, comprising:

receiving, from a receiver, a waveform that interacted with an object;

representing c in an equation image x=Φc, wherein Φ is a dictionary to represent the image x, via Compound Gaussian (CG) prior C=z⊙u, where u is a Gaussian random vector, and z is a positive non-Gaussian random vector;

determining initial estimates for z and u;

iteratively updating z based on an update function g;

iteratively updating u based on a Tikhonov least squares solution;

determining an optimization landscape for z using intermediate scale variable mapping based on updated values for z and u;

determining a prior distribution for z using a convolutional neural network;

estimating the image x based on the determined optimization landscape for z and prior distribution for z, wherein the image x is an image of the object;

generating an estimated image x based on the determined optimization landscape; and outputting the estimated image x to a display device.

19. The method of claim 1, further comprising estimating z and u by minimizing a cost function.

20. The method of claim 19, wherein the cost function is represented by $$\|y - A(z \odot u)\|_2^2 + \lambda\|u\|_2^2 + R(z),$$

wherein the term $$\|y - A(z \odot u)\|_2^2$$

encourges estimates for z and u to fit observed measurements, the term $$\|u\|_2^2$$

encourages u to be Gaussian, and the term R(z) encourages a prior distribution on z.

* * * * *